US009612456B1

(12) United States Patent
Pugh et al.

(10) Patent No.: US 9,612,456 B1
(45) Date of Patent: Apr. 4, 2017

(54) ELECTRONIC OPHTHALMIC LENS WITH ALARM CLOCK

(71) Applicant: Johnson & Johnson Vision Care, Inc., Jacksonville, FL (US)

(72) Inventors: Randall B. Pugh, St. Johns, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/920,257

(22) Filed: Oct. 22, 2015

(51) Int. Cl.
*G04G 21/02* (2010.01)
*G02C 11/00* (2006.01)
*G02C 7/04* (2006.01)
*G04G 11/00* (2006.01)
*G04G 21/04* (2013.01)
*G04G 21/00* (2010.01)

(52) U.S. Cl.
CPC .............. *G02C 11/10* (2013.01); *G02C 7/04* (2013.01); *G04G 11/00* (2013.01); *G04G 21/00* (2013.01); *G04G 21/025* (2013.01); *G04G 21/04* (2013.01)

(58) Field of Classification Search
CPC ...... G04G 21/04; G04G 21/00; G04G 21/025; G04G 11/00; G04G 21/02; G02C 7/04; G02C 11/10
See application file for complete search history.

(56) References Cited

U.S. PATENT DOCUMENTS

| | | | | |
|---|---|---|---|---|
| 7,931,832 B2* | 4/2011 | Pugh | ............... | B29D 11/00125 264/1.32 |
| 8,894,696 B2* | 11/2014 | Hurst | ..................... | H05B 37/02 607/88 |
| 9,207,647 B2* | 12/2015 | Baloa Welzien | ...... | G04G 11/00 |
| 9,217,880 B2* | 12/2015 | Pugh | ...................... | G02C 7/022 |
| 9,289,623 B2* | 3/2016 | Pugh | ........................ | G02C 7/04 |
| 2011/0096637 A1* | 4/2011 | Chiang | .................. | G04C 19/02 368/256 |
| 2014/0277291 A1* | 9/2014 | Pugh | ........................ | G02C 7/04 607/88 |
| 2014/0340630 A1* | 11/2014 | Pugh | .................... | A61B 5/1103 351/158 |
| 2014/0343387 A1* | 11/2014 | Pugh | .................... | A61B 5/6821 600/365 |
| 2014/0346695 A1* | 11/2014 | Pugh | .................... | A61B 5/7445 264/2.6 |
| 2014/0350372 A1* | 11/2014 | Pugh | .................. | A61B 5/14507 600/367 |
| 2014/0350373 A1* | 11/2014 | Pugh | ...................... | A61B 3/101 600/367 |

* cited by examiner

*Primary Examiner* — Sean Kayes

(57) ABSTRACT

An ophthalmic lens having an electronic system as described herein for providing an alarm to the wearer of the ophthalmic lens. In at least one embodiment, the system includes a lens, a timing circuit, a communications system, an alert mechanism and a system controller. In at least one embodiment, the lens provides an escalation of alarms to the wearer and/or responds to the wearer's input regarding the alarm.

16 Claims, 20 Drawing Sheets

Duration of blink 334msec
92msec Down, 242msec up
Eyelid is blocking average of 99% of visible light

ELECTRONIC OPHTHALMIC LENS WITH ALARM CLOCK

BACKGROUND OF THE INVENTION

1. Field of the Invention

The present invention relates to a powered or electronic ophthalmic lens, and more particularly, to a powered or electronic ophthalmic lens providing an alarm cue.

2. Discussion of the Related Art

As electronic devices continue to be miniaturized, it is becoming increasingly more likely to create wearable or embeddable microelectronic devices for a variety of uses. Such uses may include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to augment or enhance performance of the eye. In another example, either with or without adjustable focus, a wearable contact lens may incorporate electronic sensors to detect concentrations of particular chemicals in the pre-corneal (tear) film. The use of embedded electronics in a lens assembly introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, adjust easily to shifting light conditions, and transmit signals or information to the brain at a rate exceeding that of a high-speed internet connection. Lenses, such as contact lenses and intraocular lenses, currently are utilized to correct vision defects such as myopia (nearsightedness), hyperopia (farsightedness), presbyopia and astigmatism. However, properly designed lenses incorporating additional components may be utilized to enhance vision as well as to correct vision defects.

Contact lenses may be utilized to correct myopia, hyperopia, astigmatism as well as other visual acuity defects. Contact lenses may also be utilized to enhance the natural appearance of the wearer's eyes. Contact lenses or "contacts" are simply lenses placed on the anterior surface of the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials and were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability and are generally more comfortable to wear than the contact lenses made of the earlier hard materials.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light-emitting diodes, and miniature antennas may be integrated into contact lenses via custom-built optoelectronic components to not only correct vision, but to enhance vision as well as provide additional functionality as is explained herein. Electronic and/or powered ophthalmic lenses may be designed to provide enhanced vision via zoom-in and zoom-out capabilities, or just simply modifying the refractive capabilities of the lenses. Electronic and/or powered contact lenses may be designed to enhance color and resolution, to display textual information, to translate speech into captions in real time, to offer visual cues from a navigation system, and to provide image processing and internet access. The lenses may be designed to allow the wearer to see in low-light conditions. The properly designed electronics and/or arrangement of electronics on lenses may allow for projecting an image onto the retina, for example, without a variable-focus optic lens, and provide novelty image displays. Alternately, or in addition to any of these functions or similar functions, the contact lenses may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium, and potassium levels, as well as other biological markers. This, coupled with a wireless data transmitter, could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns.

The proper combination of devices could yield potentially unlimited functionality; however, there are a number of difficulties associated with the incorporation of extra components on a piece of optical-grade polymer. In general, it is difficult to manufacture such components directly on the lens for a number of reasons, as well as mounting and interconnecting planar devices on a non-planar surface. It is also difficult to manufacture to scale. The components to be placed on or in the lens need to be miniaturized and integrated onto just 1.5 square centimeters of a transparent polymer while protecting the components from the liquid environment on the eye. It is also difficult to make a contact lens comfortable and safe for the wearer with the added thickness of additional components.

Given the area and volume constraints of an ophthalmic device such as a contact lens, and the environment in which it is to be utilized, the physical realization of the device must overcome a number of problems, including mounting and interconnecting a number of electronic components on a non-planar surface, the bulk of which comprises optic plastic. Accordingly, there exists a need for providing a mechanically and electrically robust electronic contact lens.

As these are powered lenses, energy or more particularly current consumption, to run the electronics is a concern given battery technology on the scale for an ophthalmic lens. In addition to normal current consumption, powered devices or systems of this nature generally require standby current reserves, precise voltage control and switching capabilities to ensure operation over a potentially wide range of operating parameters, and burst consumption, for example, up to eighteen (18) hours on a single charge, after potentially remaining idle for years. Accordingly, there exists a need for a system that is optimized for low cost, long-term reliable service, safety and size while providing the required power.

In addition, because of the complexity of the functionality associated with a powered lens and the high level of interaction between all of the components comprising a powered lens, there is a need to coordinate and control the overall operation of the electronics and optics comprising a powered ophthalmic lens. Accordingly, there is a need for a system to control the operation of all of the other components that is safe, low-cost, and reliable, has a low rate of power consumption and is scalable for incorporation into an ophthalmic lens.

Powered or electronic ophthalmic lenses may have to account for certain unique physiological functions from the individual utilizing the powered or electronic ophthalmic lens. More specifically, powered lenses may have to account for blinking, including the number of blinks in a given time period, the duration of a blink, the time between blinks and any number of possible blink patterns, for example, if the individual is dosing off. Blink detection may also be utilized to provide certain functionality, for example, blinking may be utilized as a means to control one or more aspects of a powered ophthalmic lens. Additionally, external factors, such as changes in light intensity levels, and the amount of visible light that a person's eyelid blocks out, have to be accounted for when determining blinks. For example, if a room has an illumination level between fifty-four (54) and one hundred sixty-one (161) lux, a photosensor should be sensitive enough to detect light intensity changes that occur when a person blinks.

Ambient light sensors or photosensors are utilized in many systems and products, for example, on televisions to adjust brightness according to the room light, on lights to switch on at dusk, and on phones to adjust the screen brightness. However, these currently utilized sensor systems are not small enough and/or do not have low enough power consumption for incorporation into contact lenses.

It is also important to note that different types of blink detectors may be implemented with computer vision systems directed at one's eye(s), for example, a camera digitized to a computer. Software running on the computer can recognize visual patterns such as the eye open and closed. These systems may be utilized in ophthalmic clinical settings for diagnostic purposes and studies. Unlike the above described detectors and systems, these systems are intended for off-eye use and to look at rather than look away from the eye. Although these systems are not small enough to be incorporated into contact lenses, the software utilized may be similar to the software that would work in conjunction with powered contact lenses. Either system may incorporate software implementations of artificial neural networks that learn from input and adjust their output accordingly. Alternately, non-biology based software implementations incorporating statistics, other adaptive algorithms, and/or signal processing may be utilized to create smart systems.

Accordingly, there exists a need for a means and method for detecting certain physiological functions, such as a length of eye closure or a blink, and utilizing them to activate and/or control an electronic or powered ophthalmic lens according to the type of blink sequence detected by a sensor. The sensor being utilized needs to be sized and configured for use in a contact lens. In addition there exists a need to detect the position of a user's eyelids. An eyelid position sensor could be used to detect that a user is falling asleep, for example to trigger an appropriate alert to keep the user awake. There are existing systems for detecting lid position; however they are limited to devices like camera imagers, image recognition, and infrared emitter/detector pairs which rely on reflection off the eye and eyelid. Existing systems to detect lid position also rely on the use of spectacles or clinical environments and are not easily contained within a contact lens.

Travel alarm clocks, alarm clocks, and other external devices used to provide alarm clock functionality are bulky and disruptive to other people within hearing range of the alarm clock beyond the intended person to be awaken by the alarm clock. Examples of this situation are a couple where one member needs to wake up earlier than the other member of the couple or an airline passenger on a red-eye flight looking to adjust his or her circadian rhythm during a flight. It would be advantageous if there was a way to provide an alarm for a particular individual that would not disrupt other individuals and thus be less intrusive of other individuals.

SUMMARY OF THE INVENTION

In at least one embodiment, a system for providing an alarm cue to a wearer of an ophthalmic lens, the system including: a timing circuit configured to track a passage of time; a communications system configured for facilitating at least one-way communication for receiving data; an alert mechanism configured to provide an alert; a system controller electrically connected to the timing circuit, the communication system, and the alert mechanism, the system controller configured for controlling the timing circuit, the communication system, and the alert mechanism; and the ophthalmic lens capable of encapsulating at least a portion of the timing circuit, the communications system, the alert mechanism and the system controller.

In a further embodiment, the communications system includes a receiver configured for wirelessly receiving from an external device the received data and sending the received data to the system controller. In a still further embodiment, the timing circuit includes an accumulator for tracking time; and the system controller further includes memory in which an alarm time is stored by the system controller, the system controller is configured to set a time on the accumulator in response to the received data and an alarm time in the memory in response to the received data. In a still further embodiment, the system controller is configured to send a signal to the alert mechanism when data in the accumulator matches data stored in the memory, the alarm mechanism is configured to provide an alert to a wearer of the ophthalmic lens in response to the signal received from the system controller. In a further embodiment to the first embodiment of this paragraph, the timing circuit includes an accumulator for tracking time; the system controller further includes memory in which an alarm time is stored by the system controller, the system controller is configured to reset the accumulator to zero in response to the received data and an alarm time in the memory in response to the received data. Further to the prior embodiment, the system controller is configured to send a signal to the alert mechanism when data in the accumulator matches data stored in the memory, the alarm mechanism is configured to provide an alert to a wearer of the ophthalmic lens in response to the signal received from the system controller.

Further to any of the above embodiments, the alert mechanism includes an electrical component, and the alert mechanism turns on the electrical component to alert the wearer in response to an alarm signal from the system controller. In a further embodiment, the electrical component includes at least one of a LED and a transducer in vibrational contact with the wearer's eye.

Further to any of the above embodiments, the alert mechanism includes at least one of the following: a light source positioned on the lens to provide a light onto at least one of a retina of a wearer of the lens and the lens itself as the alert, a transducer to vibrate the eye of the wearer of the lens as the alert, an electrical simulator configured to stimulate at least one of a corneal surface, a scleral surface, a sensory nerve of a cornea, and a sensory nerve of a sclera, and a transducer that provides optic zone modification of an optic zone of the lens.

Further to any of the above embodiments, the system further including an eyelid position sensor system incorporated into the lens, the eyelid position sensor system having a plurality of vertical points to detect eyelid position, where the system controller is in electrical communication with the eyelid position sensor system to receive a signal from the eyelid position sensor system representative of eyelid position, the system controller triggering an escalation of alerts from the alert mechanism when the eyelid remains closed and the accumulator value exceeds an alarm value.

Further to any of the above embodiments, the system further including an external device configured to transmit to the communications system a time control signal as the received data; and where the communications system includes a receiver configured for wirelessly receiving the time control signal from the external device and sending the time control signal to the system controller; the timing circuit includes an accumulator for tracking time; and the system controller further includes memory in which an alarm time is stored by the system controller, the system controller configured to set a time on the timing circuit in response to the time control signal and an alarm time in the memory in response to the time control signal. In a still further embodiment to the prior embodiment, the system controller is configured to send a signal to the alert mechanism when data in the timing circuit matches data stored in the memory, the alarm mechanism is configured to provide an alert to a wearer of the contact lens in response to the signal received from the system controller.

In at least one embodiment, a system for providing an alarm cue on two pupils, the system having a first contact lens including a timing circuit configured to track a passage of time, a communications system configured for facilitating at least one-way communication with an external device, an alert mechanism configured to provide an alert, a system controller electrically connected to the timing circuit, the communication system, and the alert mechanism, the system controller configured for controlling the timing circuit, the communication system, and the alert mechanism, and an insert encapsulating at least a portion of the timing circuit, the communications system, the alert mechanism and the system controller of the contact lens; and a second contact lens including a communications system configured for facilitating at least one-way communication with the communications system of the first contact lens including an alarm signal, an alert mechanism configured to provide an alert in response to the alarm signal received from the communications system, and an insert encapsulating at least a portion of the communications system and the alert mechanism.

Further to the prior embodiment, each of the first contact lens and the second contact lens includes an eyelid position sensor system having a plurality of vertical points to detect eyelid position, and where the system controller of the first contact lens is in electrical communication with the eyelid position sensor systems to receive a signal from each of the eyelid position sensor system representative of eyelid position, the system controller triggers an alarm when a value as represented by a signal from the timing circuit matches an alarm value by sending a signal to the alert mechanism of the first contact lens and through the communications systems to the alert mechanism on the second contact lens where the signal causes activation of the alert mechanisms to provide an alarm, and the system controller triggering an escalation of alerts from the alert mechanisms when the eyelids remain closed and the accumulator value exceeds an alarm escalation value that is greater than the alarm value.

Further to either of the previous two embodiments, the system controller is configured to sample at a predetermined rate, and at least temporarily saving collected samples, determining when the eyelids are open or closed in order to determine the number, time period and pulse width of the blinks from the collected samples, calculating a number of blinks and the duration of the blinks in a given time period, comparing the number of blinks, the durations of the blinks in the given time period, and the time between blinks in the given time period to a stored set of samples to determine patterns in blinking, and determining if the blinks correspond to one or more intentional blink sequences; and where the intentional blink sequences control operation of system controller triggering the alert mechanisms and include at least one of an alarm snooze, an alarm termination, and an alarm value setting.

Further to any of the previous three embodiments, each alert mechanism includes an electrical component, and each alert mechanism turns on the electrical component to alert the wearer in response to an alarm signal from the system controller. In a further embodiment, the electrical component includes at least one of a LED and a transducer in vibrational contact with the wearer's eye.

Further to any of the previous five embodiments, at least one alert mechanism includes at least one of the following: a light source positioned in the lens to provide a light onto at least one of a retina of a wearer of the lens and the lens itself as the alert, a transducer to vibrate an eye of a wearer of the lens as the alert, an electrical simulator configured to stimulate at least one of a corneal surface, a scleral surface, a sensory nerve of a cornea, and a sensory nerve of a sclera, and a transducer that provides optic zone modification of an optic zone of the lens.

Further to any of the previous six embodiments, the system further including an external device configured to transmit to the communications system of the first contact lens a time control signal; and where the communications system of the first contact lens includes a receiver configured for wirelessly receiving the time control signal from the external device and sending the time control signal to the system controller; the timing circuit includes an accumulator for tracking time; and the system controller further includes memory in which an alarm time is stored by the system controller, the system controller configured to set a time on the timing circuit in response to the time control signal and an alarm time in the memory in response to the time control signal.

In at least one embodiment, a method for providing an alarm to a wearer of an ophthalmic lens, the method including: receiving an alarm time with a communications circuit and a system controller, setting an alarm value by the system controller in memory based on the received alarm time, initiating a timing circuit by the system controller, comparing with the system controller the timing circuit output to the alarm value in memory, and when the timing circuit output exceeds the stored alarm value, the system controller sending a signal to an alert mechanism triggering an alarm on the ophthalmic lens.

Further to the previous embodiment, the method further including: detecting whether at least one eyelid remains closed with at least one eyelid position sensor, when at least one eyelid remains closed, the system controller escalating the alarm provided by the alert mechanism, when at least one eyelid is open, the system controller terminating the alarm by sending a termination signal to the alert mechanism.

Further to the previous method embodiments, the method further including: receiving a snooze instruction with the communications circuit, and incrementing the alarm value by a predetermined snooze value by the system controller in response to the snooze instruction. In a further embodiment, the snooze instruction is received from a blink pattern detected by an eyelid position sensor of the communications circuit and the system controller. Further to either of the previous two embodiments, the snooze instruction is received from an external device by the system controller through the communications circuit.

Further to the previous method embodiments, the method further including terminating the alarm in response to the received blink pattern detected by an eyelid position sensor of the communications circuit and the system controller. Further to the previous method embodiments, the method further including terminating the alarm in response to a termination instruction received from an external device by the system controller through the communications circuit.

In at least one embodiment, the present invention is directed to a powered ophthalmic lens. The powered ophthalmic lens includes an intraocular lens, a timing circuit, a system controller configured to determine if the alarm time has been reached and provide an output control signal, and at least one alert mechanism configured to receive the output control signal and implement a predetermined function of alerting of the wearer.

In at least one embodiment, a powered ophthalmic lens includes: an intraocular lens; and an eyelid position sensor system incorporated into the lens and having a sensor array with a plurality of individual sensors to detect eyelid position, a timing circuit, a system controller configured to sample each individual sensor in the sensor array to detect eyelid position to determine whether the eyelid is open and provide an output control signal, and at least one alert mechanism configured to receive the output control signal.

Control of a powered ophthalmic lens may be accomplished through a manually operated external device that communicates with the lens wirelessly, such as a hand-held remote unit. Alternately, control of the powered ophthalmic lens may be accomplished via feedback or control signals directly from the wearer. For example, sensors built into the lens may detect blinks and/or blink patterns. Based upon the pattern or sequence of blinks, the powered ophthalmic lens may change operation state, for example, between an awake operation state and an asleep operation state.

The blink detection method is a component of the system controller which detects characteristics of blinks, for example, if the eyelid is open or closed, the duration of the blink open or closed, the inter-blink duration, and the number of blinks in a given time period. The method in accordance with at least one embodiment relies on sampling light incident on the eye at a certain sample rate. Predetermined blink patterns are stored and compared to the recent history of incident light samples. When patterns match, the blink detection method triggers activity in the system controller, for example, to switch to a particular operation state.

The present invention is also directed to a powered or electronic ophthalmic lens that incorporates an alert mechanism.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1A:
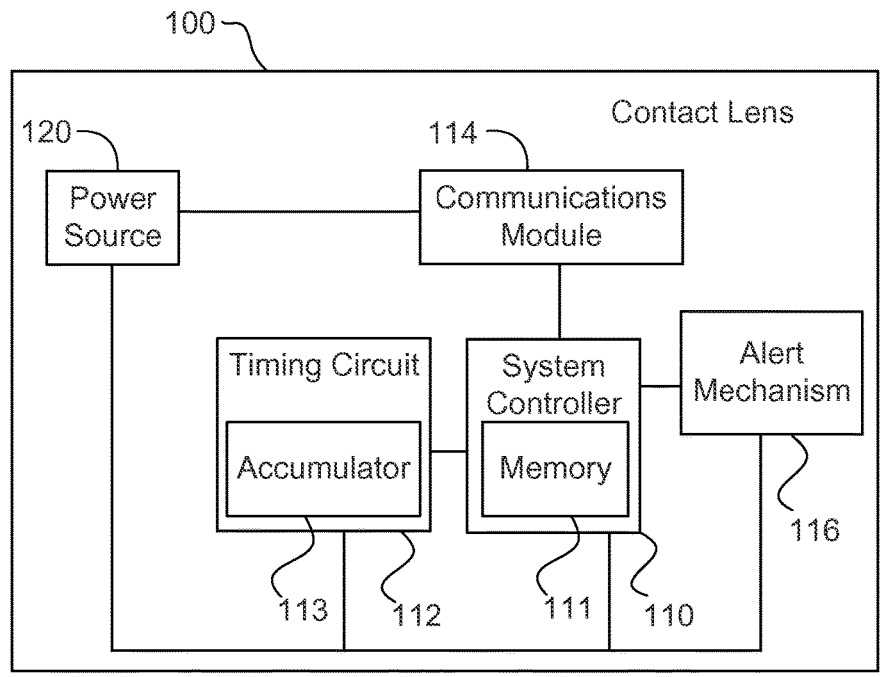
FIGS. 1A and 1B illustrate contact lenses having alarm components in accordance with at least one embodiment of the present invention.

Conventional contact lenses are polymeric structures with specific shapes to correct various vision problems as briefly set forth above. To achieve enhanced functionality, various circuits and components may be integrated into these polymeric structures. For example, control circuits, microsystem controllers, communication devices, power supplies, sensors, alert mechanisms, light-emitting diodes, and miniature antennas may be integrated into contact lenses via custom-built optoelectronic components to not only correct vision, but to enhance vision as well as provide additional functionality as is explained herein. Electronic and/or powered contact lenses may be designed to provide enhanced vision via zoom-in and zoom-out capabilities, or just simply modifying the refractive capabilities of the lenses. Electronic and/or powered contact lenses may be designed to enhance color and resolution, to display textual information, to translate speech into captions in real time, to offer visual cues from a navigation system, and to provide image processing and internet access. The lenses may be designed to allow the wearer to see in low light conditions. The properly designed electronics and/or arrangement of electronics on lenses may allow for projecting an image onto the retina, for example, without a variable focus optic lens, provide novelty image displays and even provide wakeup alerts. In addition, sensors built into the lenses may be utilized to detect light incident on the eye to compensate for ambient light conditions or for use in determining blink patterns and whether the wearer is asleep or awake.

In at least one embodiment, the powered or electronic contact lens elements to correct and/or enhance the vision of patients with one or more of the above-described vision defects or otherwise perform a useful ophthalmic function. In addition, the electronic contact lens may be utilized simply to enhance normal vision or provide a wide variety of functionality as described above. The electronic contact lens may have a variable-focus optic lens, an assembled front optic embedded into a contact lens or just simply embedding electronics without a lens for any suitable functionality. The electronic lens may be incorporated into any number of contact lenses as described above. In addition, intraocular lenses may also incorporate the various components and functionality described herein. However, for ease of explanation, the disclosure will focus on an electronic contact lens to correct vision defects intended for single-use daily disposability.

The present invention may be employed in a powered ophthalmic lens or powered contact lens having an electronic system, which actuates a variable-focus optic or any other device or devices configured to implement any number of numerous functions that may be performed. The electronic system includes one or more batteries or other power sources, power management circuitry, one or more sensors, clock generation circuitry, control algorithms and circuitry, and lens driver circuitry. The complexity of these components may vary depending on the required or desired functionality of the lens. Alternatively, the contact lens may just provide an alarm for the wearer.

Control of an electronic or a powered ophthalmic lens may be accomplished through a manually operated external device that communicates with the lens, such as a hand-held remote unit. For example, a fob may wirelessly communicate with the powered lens based upon manual input from the wearer. Alternatively, control of the powered ophthalmic lens may be accomplished via feedback or control signals directly from the wearer. For example, sensors built into the lens may detect blinks, blink patterns, and/or eyelid closures. Based upon the pattern or sequence of blinks, the powered ophthalmic lens may change operation state, for example, the operation state of the lens or its operation state for detecting sleep by the wearer. A further alternative embodiment is one in which the lens receives input from the wearer from an external device such as a computer or a smart phone. A further alternative is that the wearer has no control over operation of the powered ophthalmic lens.

FIG. 1A illustrates a system resident in a contact lens 100 for providing an alarm cue on at least one pupil. The illustrated system includes a system controller 110, a timing circuit 112, a communications module (or system) 114, and an alert mechanism 116 that in at least one embodiment are at least partially encapsulated in a contact lens. The system controller 110 is in electrical communication with the timing circuit 112, the communications module 114 and the alert mechanism 116.

The timing circuit 112 in at least one embodiment includes an accumulator 113 for tracking the passing of time. An example of an accumulator is a register acting as a counter. In an alternative embodiment, the accumulator 113 is set to a value approximating the time in the future when the alarm is to be provided to the wearer and works in reverse counting down from that value, which leads to the system controller performing a comparison of the reading to zero to determine when to send the alert signal. In alternative embodiments, the timing circuit 112 may include an oscillator comprising crystal, for example quartz, resistor-capacitor (RC), inductor-capacitor (LC), and/or relaxation circuitry.

The communications module 114 in at least one embodiment includes components to facilitate communication from an external source to the lens. Examples of the external source include the contact lens wearer via blinks, a fob, and a computer or a smartphone. Examples of components to facilitate this communication include blink detection components, light detection components, radio-frequency (RF) components, and an antenna. In the light detection or blink detection embodiments, the data structure includes an hour and a minute as an absolute time or a relative time in the future after an initial synching instruction from the external source or the wearer as the case may be. In at least one embodiment, the blink detection components and the light detection components are the same components as will be discussed later in this disclosure. In at least one embodiment, the communications module 114 includes the blink detection components.

In at least one embodiment, the system controller 110 includes a memory 111 configured to store a representation of time to be compared to the timing circuit 112 to determine when to activate the alert mechanism 116 to provide the at least one alarm. The system controller 110 in at least one embodiment manipulates the received alarm time to be stored in memory 111 to facilitate comparison with the signal from the timing circuit 112 or to set the accumulator 113. The stored time representation is at least one of a value representing the number of cycles in the future that the alarm is to be triggered, the time set for the alarm, and an amount of time in the future that the alarm is to be triggered. In an alternative embodiment, the time is a relative time or an absolute time value. The stored time representation will be based on the timing circuit configuration and the communications module configuration in terms of the form of the data being received representing the set time for the alarm.

In at least one embodiment, the contact lens 100 includes an electronic insert in which other components are at least partially encapsulated. The contact lens in at least one embodiment includes an optical zone and peripheral zone where the peripheral zone is around the periphery of the optical zone.

In a further embodiment as illustrated in FIG. 1A, the system includes a power source 120. The power source 120 supplies power for numerous components including the alert mechanism 116. The power may be supplied from a battery, energy harvester, or other suitable means as is known to one of ordinary skill in the art. Essentially, any type of power source 120 may be utilized to provide reliable power for all other components of the system.

The alert mechanism 116 may include any suitable device for implementing a specific alert to the wearer based upon a received command (or alert) signal from the system controller 110. For example, if the alarm activates the system controller 110 as described above, the system controller 110 may enable the alert mechanism 116, such as a light (or light array) to pulse a light into or cause a physical wave to pulsate onto the wearer's cornea or sclera (or alternatively across the lens). Further examples of the alert mechanism 116 include an electrical device; a mechanical device including, for example, piezoelectric devices, transducers, vibrational devices, chemical release devices with examples including the release of chemicals to cause an itching, irritation or burning sensation, and acoustic devices; a transducer providing optic zone modification of an optic zone of the contact lens such as modifying the focus and/or percentage of light transmission through the lens; a magnetic device; an electromagnetic device; a thermal device; an optical coloration mechanism with or without liquid crystal, a light emitting diode (LED), prisms, fiber optics, and/or light tubes to, for example, provide an optic modification and/or direct light towards the retina or apply a tinting to the optical zone; a liquid crystal display (LCD) and/or a LED to show a message including, for example, the current time; an electrical device such as an electrical stimulator to provide a mild stimulation or to stimulate at least one of a corneal or scleral surface and one or more sensory nerves of the cornea or sclera; or any combination thereof. In at least one embodiment, alert mechanism 116 receives a signal from the system controller 110 in addition to power from the power source 120 and produces some action based on the signal from the system controller 110. In an alternative embodiment, the signal from the system controller 110 is an electrical connection between the alert mechanism 116 and the power source 120 so that the availability of power activates the alert mechanism 116.

Figure 1B:
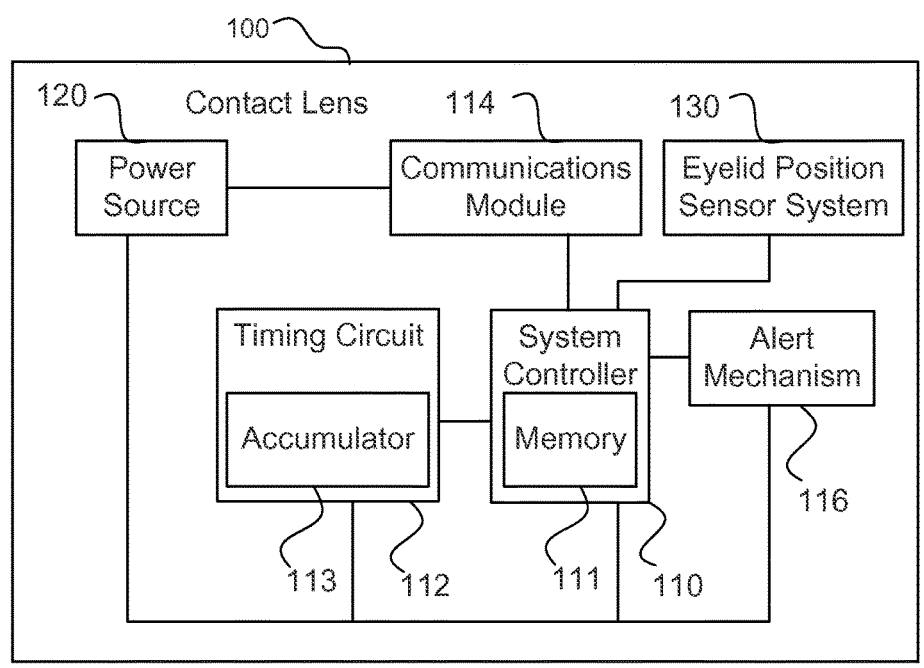

FIG. 1B illustrates an alternative embodiment that adds an eyelid position sensor system 130 to the system illustrated in FIG. 1A. The system controller 110 is in electrical communication with the eyelid position sensor system 130. In at least one embodiment, the system controller 110 samples the eyelid position sensor system 130 proximate to the determination that an alert signal is to be sent to the alert mechanism 116 to determine whether the eyelid is closed or open. In at least one embodiment, when the determination is that the eyelid is open, then the alert signal is cancelled and not sent as the wearer is presumed to be awake and not requiring the alarm. In an alternative embodiment, the sample is only taken at a predetermined time after the alert signal is sent to allow the wearer to receive the alert. In a further alternative embodiment, when the eyelids are detected as being closed at the predetermined time, then the system controller 110 sends a second alert signal to the alert mechanism 116 to provide an escalated alert to the wearer of the alarm.

In such an illustrated embodiment, the alert mechanism 116 receives a signal from the system controller 110 to escalate the alert being given to the wearer, in such an embodiment the alert mechanism 116 will have at least two levels and/or types of alerts to be given to the wearer to provide for escalation in the alert, for example when the wearer's eyelids remain closed despite an initial alert which eyelid position in at least one embodiment is detected using an eyelid position sensor system 130. In a further embodiment, there are a plurality of escalation levels available.

Figure 2A:
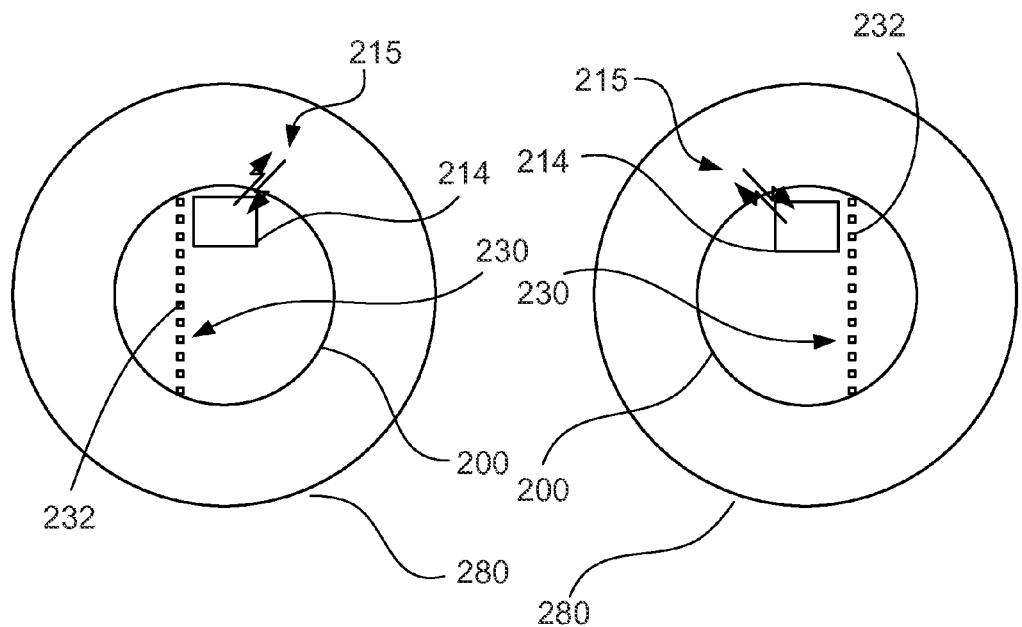
FIG. 2A illustrates a diagrammatic representation of two eyelid position sensors having a communication channel for synchronizing operation between two eyes in accordance with at least one embodiment of the present invention.
Figure 2B:
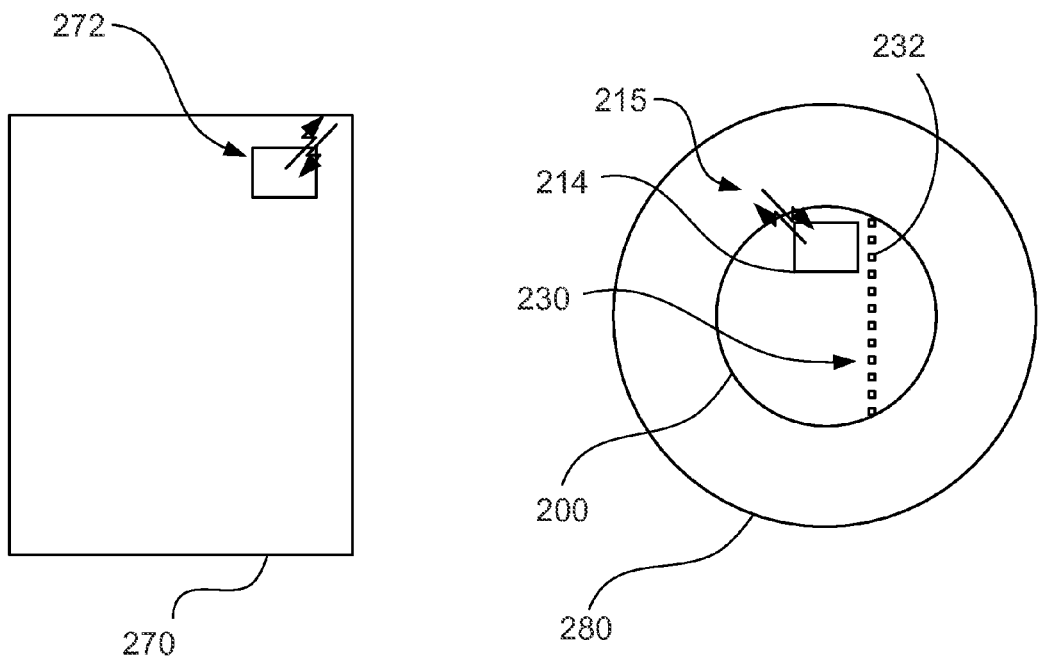
FIG. 2B illustrates a diagrammatic representation of a contact lens having a communication channel for communication with an external device in accordance with at least one embodiment of the present invention.

FIG. 2A illustrates a system in which two eyes 280 are at least partially covered with contact lenses 200. Sensor arrays 230 are present in both of the contact lenses 200 to determine lid position, as will be described later with respect to FIGS. 14A and 14B. In this embodiment, the contact lenses 200 each include an electronic communication component 214. Electronic communication component 214 in each contact lens 200 permits two-way communication to take place between the contact lenses 200. The electronic communication components 214 may include RF transceivers, antennas, interface circuitry for photosensors 232, and associated or similar electronic components. The communication channel represented by line 215 may include RF transmissions at the appropriate frequency and power with an appropriate data protocol to permit effective communication between the contact lenses 200. Transmission of data between the two contact lenses 200 may, for example, verify that both lids are closed in order to detect a true, sleep condition for the wearer. The transmission may also allow for sending an alarm signal from one lens to the second lens to trigger an alert mechanism in the second lens. Data transmission may also take place from an external device 270, for example, a smartphone (or other processor based system) to set the time for an alarm as illustrated, for example in FIG. 2B, having an electronic communication components 272. As such the electronic communication components 214 may be present on just one lens in at least one alternative embodiment and in a further alternative embodiment there is just one lens.

Figure 3:
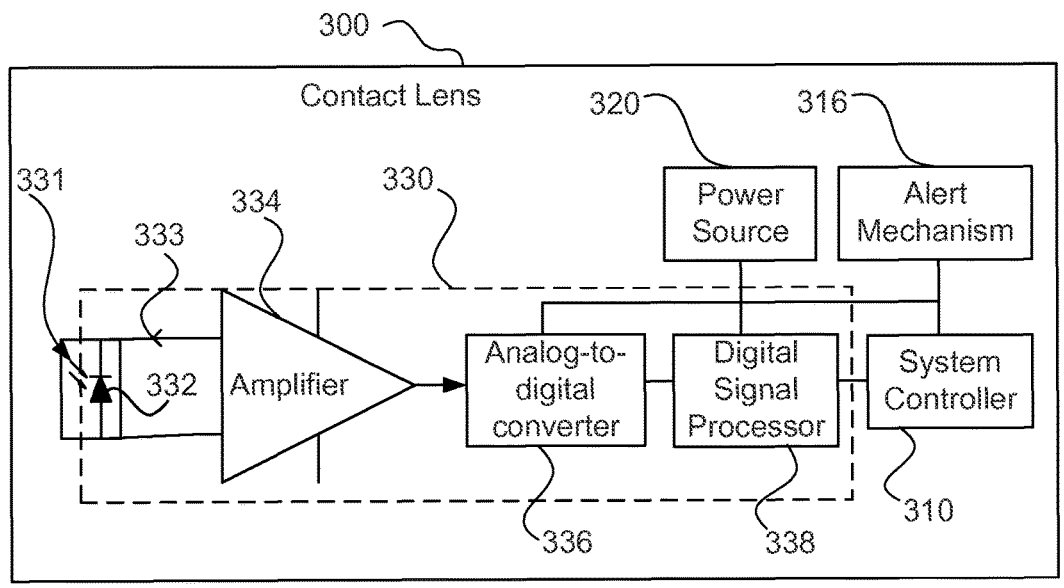
FIG. 3 illustrates a contact lens comprising a blink detection system in accordance with at least one embodiment of the present invention.

FIG. 3 illustrates, in block diagram form, a contact lens 300 having an electronic eyelid position system 330, in accordance with at least one embodiment. In this embodiment, the electronic eyelid position system 330 may include a photosensor 332, an amplifier 334, an analog-to-digital converter (or ADC) 336, a digital signal processor 338. The contact lens 300 also includes a power source 320, a system controller 310, and an alert mechanism 316.

When the contact lens 300 is placed onto the front surface of a user's eye the electronic circuitry of the eyelid position system 330 may be utilized to detect whether the eyelid is open or close. The photosensor 332, as well as the other circuitry, is configured to detect blinks, various blink patterns produced by the user's eye, and/or level of eyelid closure.

In this embodiment, the photosensor 332 may be embedded into the contact lens 330 and receives ambient light 331, converting incident photons into electrons and thereby causing a current, indicated by arrow 333, to flow into the amplifier 334. The photosensor or photodetector 332 may include any suitable device. In one embodiment, the photosensor 332 includes at least one photodiode. In at least one embodiment, the photodiode is implemented in a complimentary metal-oxide semiconductor (CMOS process technology) to increase integration ability and reduce the overall size of the photosensor 332 and the other circuitry. The current 333 is proportional to the incident light level and decreases substantially when the photodetector 332 is covered by an eyelid. The amplifier 334 creates an output proportional to the input, with gain, and may function as a transimpedance amplifier which converts input current into output voltage. The amplifier 334 may amplify a signal to a usable level for the remainder of the system, such as giving the signal enough voltage and power to be acquired by the ADC 336. For example, the amplifier may be necessary to drive subsequent blocks since the output of the photosensor 332 may be quite small and may be used in low-light environments. The amplifier 334 may be implemented as a variable-gain amplifier, the gain of which may be adjusted by the system controller 310, in a feedback arrangement, to maximize the dynamic range of the system. In addition to providing gain, the amplifier 334 may include other analog signal conditioning circuitry, such as filtering and other circuitry appropriate to the photosensor 332 and amplifier 334 outputs. The amplifier 334 may include any suitable device for amplifying and conditioning the signal output by the photosensor 332. For example, the amplifier 334 may include a single operational amplifier or a more complicated circuit comprising one or more operational amplifiers. The photosensor 332 may be a switchable array of photodiodes, and the amplifier 334 may be an integrator. As set forth above, the photosensor 332 and the amplifier 334 are configured to detect and isolate blink sequences based upon the incident light intensity received through the eye and convert the input current into a digital signal usable ultimately by the system controller 310. In at least one embodiment, the system controller 310 is preprogrammed or preconfigured to recognize various blink sequences, blink patterns, an/or eyelid closures (partial or complete) in various light intensity level conditions and provide an appropriate output signal to the alert mechanism 316. In at least one embodiment, the system controller 310 also includes associated memory.

In this embodiment, the ADC 336 may be used to convert a continuous, analog signal output from the amplifier 334 into a sampled, digital signal appropriate for further signal processing. For example, the ADC 336 may convert an analog signal output from the amplifier 334 into a digital signal that may be usable by subsequent or downstream circuits, such as a digital signal processing system or microprocessor 338. A digital signal processing system or digital signal processor 338 may be utilized for digital signal processing, including one or more of filtering, processing, detecting, and otherwise manipulating/processing sampled data to permit incident light detection for downstream use. The digital signal processor 338 may be preprogrammed with the blink sequences and/or blink patterns along with blink sequence indicating prolonged eyelid closure or eyelid drift. The digital signal processor 338 also includes associated memory, which in at least one embodiment stores template and masks sets to detect, for example, blink patterns for each operation state as selected by the system controller 310. The digital signal processor 338 may be implemented utilizing analog circuitry, digital circuitry, software, or a combination thereof. In the illustrated embodiment, it is implemented in digital circuitry. The ADC 336 along with the associated amplifier 334 and digital signal processor 338 are activated at a suitable rate in agreement with the sampling rate previously described, for example every one hundred (100) ms, which is subject to adjustment in at least one embodiment.

A blink sequence in at least one embodiment may be utilized to change the operation state of the system and/or the system controller. In further embodiments, the system controller 310 may control other aspects of a powered contact lens depending on input from the digital signal processor 338, for example, changing the focus or refractive power of an electronically controlled lens through an actuator.

Figure 4:
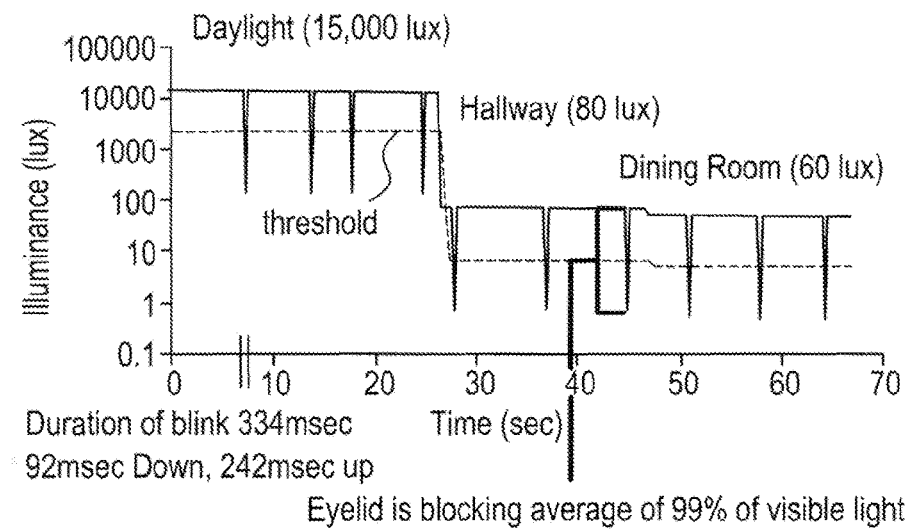
FIG. 4 illustrates a graphical representation of light incident on the surface of the eye versus time, illustrating a possible involuntary blink pattern recorded at various light intensity levels versus time and a usable threshold level based on some point between the maximum and minimum light intensity levels in accordance with at least one embodiment of the present invention.

In at least one embodiment, the system controller 310 will determine the operation state of the lens based on a received blink pattern to set the operation state as an asleep operation state or an awake operation state although in an alternative embodiment other states are possible. Further to this embodiment, the operation state will determine a set of templates and masks to be used by the digital signal processor 338 in that operation state In at least one embodiment, system controller 310 uses the signal from the photosensor chain; namely, the photosensor 332, the amplifier 334, the ADC 336 and the digital signal processing system 338, to compare sampled light levels to blink activation patterns and/or to determine eyelid closure. Referring to FIG. 4, a graphical representation of blink pattern samples recorded at various light intensity levels versus time and a usable threshold level is illustrated. Accordingly, accounting for various factors may mitigate and/or prevent error in detecting blinks when sampling light incident on the eye, such as accounting for changes in light intensity levels in different places and/or while performing various activities. Additionally, when sampling light incident on the eye, accounting for the effects that changes in ambient light intensity may have on the eye and eyelid may also mitigate and/or prevent error in detecting blinks, such as how much visible light an eyelid blocks when it is closed in low-intensity light levels and in high-intensity light levels. In other words, in order to prevent erroneous blinking patterns from being utilized to control, the level of ambient light is preferably accounted for as is explained in greater detail below.

For example, in a study, it has been found that the eyelid on average blocks approximately ninety-nine (99) percent of visible light, but at lower wavelengths less light tends to be transmitted through the eyelid, blocking out approximately 99.6 percent of visible light. At longer wavelengths, toward the infrared portion of the spectrum, the eyelid may block only thirty (30) percent of the incident light. What is important to note; however, is that light at different frequencies, wavelengths and intensities may be transmitted through the eyelids with different efficiencies. For example, when looking at a bright light source, an individual may see red light with his or her eyelids closed. There may also be variations in how much visible light an eyelid blocks based upon an individual, such as an individual's skin pigmentation. As is illustrated in FIG. 4, data samples of blink patterns across various lighting levels are simulated over the course of a seventy (70) second time interval wherein the visible light intensity levels transmitted through the eye are recorded during the course of the simulation, and a usable threshold value is illustrated. The threshold is set at a value in between the peak-to-peak value of the visible light intensity recorded for the sample blink patterns over the course of the simulation at varying light intensity levels. Having the ability to preprogram blink patterns while tracking an average light level over time and adjusting a threshold may be critical to being able to detect when an individual is blinking, as opposed to when an individual is not blinking and/or there is just a change in light intensity level in a certain area.

The system controller uses a blink detection method to detect characteristics of blinks, for example, is the lid open or closed, the duration of the blink, the inter-blink duration, and the number of blinks in a given time period. In at least one embodiment the blink detection method relies on sampling light incident on the eye at a certain sample rate. Pre-determined blink patterns are stored and compared to the recent history of incident light samples. When patterns match, the blink detection method may trigger activity in the system controller, for example to set and/or change the alarm time and/or other operations of the lens. The blink detection method in at least one embodiment further distinguishes between the pre-determined blink patterns and the eyelid movements associated with drowsiness, sleep onset, or sleep.

Blinking is the rapid closing and opening of the eyelids, and is an essential function of the eye. Blinking protects the eye from foreign objects, for example, individuals blink when objects unexpectedly appear in proximity to the eye. Blinking provides lubrication over the anterior surface of the eye by spreading tears. Blinking also serves to remove contaminants and/or irritants from the eye. Normally, blinking is done automatically, but external stimuli may contribute as in the case with irritants. However, blinking may also be purposeful, for example, for individuals who are unable to communicate verbally or with gestures can blink once for yes and twice for no. The blink detection method and system of the present invention utilizes blinking patterns that cannot be confused with normal blinking response. In other words, if blinking is to be utilized as a means for controlling an action, then the particular pattern selected for a given action cannot occur at random; otherwise inadvertent actions may occur. As blink speed and/or frequency may be affected by a number of factors, including fatigue, concentration, boredom, eye injury, medication and disease, blinking patterns for control purposes preferably account for these and any other variables that affect blinking. The average length of involuntary blinks is in the range of about one hundred (100) to four hundred (400) milliseconds. Average adult men and women blink at a rate of ten (10) involuntary blinks per minute, and the average time between involuntary blinks is about 0.3 to seventy (70) seconds. Eyelid movements may also indicate other conditions such as drowsiness, as the eyelids have a general trend towards closing over a period of time or are closed for a period of time indicating that the wearer is asleep.

An embodiment of the blink detection method may be summarized in the following steps.

1. Define an intentional "blink sequence" that a user will execute for positive blink detection or that is representative of sleep onset.

2. Sample the incoming light level at a rate consistent with detecting the blink sequence and rejecting involuntary blinks.

3. Compare the history of sampled light levels to the expected "blink sequence," as defined by a blink template of values.

4. Optionally implement a blink "mask" sequence to indicate portions of the template to be ignored during comparisons, e.g. near transitions. This may allow for a user to deviate from a desired "blink sequence," such as a plus or minus one (1) error window, wherein one or more of lens activation, control, and focus change can occur. Additionally, this may allow for variation in the user's timing of the blink sequence.

A blink sequence may be defined as follows:
1. blink (closed) for 0.5 s
2. open for 0.5 s
3. blink (closed) for 0.5 s At a one hundred (100) ms sample rate, a twenty (20) sample blink template is given by
blink_template=[1,1,1, 0,0,0,0,0, 1,1,1,1,1, 0,0,0,0, 1,1].

The blink mask is defined to mask out the samples just after a transition (0 to mask out or ignore samples), and is given by
blink_mask=[1,1,1, 0,1,1,1,1, 0,1,1,1,1, 0,1,1,1,1, 0,1].

Optionally, a wider transition region may be masked out to allow for more timing uncertainty, and is given by
blink_mask=[1,1,0, 0,1,1,1,0, 0,1,1,1,0, 0,1,1,1,0, 0,1].

Alternate patterns may be implemented, e.g. single long blink, in this case a 1.5 s blink with a 24-sample template, given by
blink_template=[1,1,1,1,0,0, 0,0,0,0,0,0, 0,0,0,0,0,0, 0,1,1,1,1,1].

A further alternative pattern may be implemented as indicative of sleep, in this case a 2.4 s blink (or eyes that have closed for sleep) with a 24-sample template, given by
blink_template=[0,0,0,0,0,0, 0,0,0,0,0,0, 0,0,0,0,0,0, 0,0,0,0,0,0].

In an alternative embodiment, this blink_template is used without a blink_mask.

It is important to note that the above example is for illustrative purposes and does not represent a specific set of data.

Detection may be implemented by logically comparing the history of samples against the template and mask. The logical operation is to exclusive-OR (XOR) the template and the sample history sequence, on a bitwise basis, and then verify that all unmasked history bits match the template. For example, as illustrated in the blink mask samples above, in each place of the sequence of a blink mask that the value is logic 1, a blink has to match the blink mask template in that place of the sequence. However, in each place of the sequence of a blink mask that the value is logic 0, it is not necessary that a blink matches the blink mask template in that place of the sequence. For example, the following Boolean algorithm equation, as coded in MATLAB® (Math-Works, Natick, Mass.), may be utilized.

matched=not (blink_mask)|not (xor (blink_template, test_sample)), wherein test_sample is the sample history. The matched value is a sequence with the same length as the blink template, sample history and blink_mask. If the matched sequence is all logic 1's, then a good match has occurred. Breaking it down, not (xor (blink_template, test_sample)) gives a logic 0 for each mismatch and a logic 1 for each match. Logic "oring" with the inverted mask forces each location in the matched sequence to a logic 1 where the mask is a logic 0. Accordingly, the more places in a blink mask template where the value is specified as logic 0, the greater the margin of error in relation to a person's blinks is allowed. It is also important to note that the greater the number of logic 0's in the blink mask template, the greater the potential for false positive matched to expected or intended blink patterns. It should be appreciated that a variety of expected or intended blink patterns may be programmed into a device with one or more active at a time and in at least one embodiment control the use of particular blink patterns to be used in a particular operation state. More specifically, multiple expected or intended blink patterns may be utilized for the same purpose or functionality, or to implement different or alternate functionality. For example, one blink pattern may be utilized to cause the lens to change operation state, snooze the alarm, terminate the alarm, and/or set the alarm. The blink detection in at least one embodiment also can detect when the eyelids remain closed, which would be detected as a continuous blink.

FIGS. 5-18 provide examples of eyelid position sensor systems (or blink detection sensor systems). In at least one embodiment, the eyelid position sensor systems use blink detection to determine whether the eyelid is closed and remains closed over a period of time.

Figure 5:
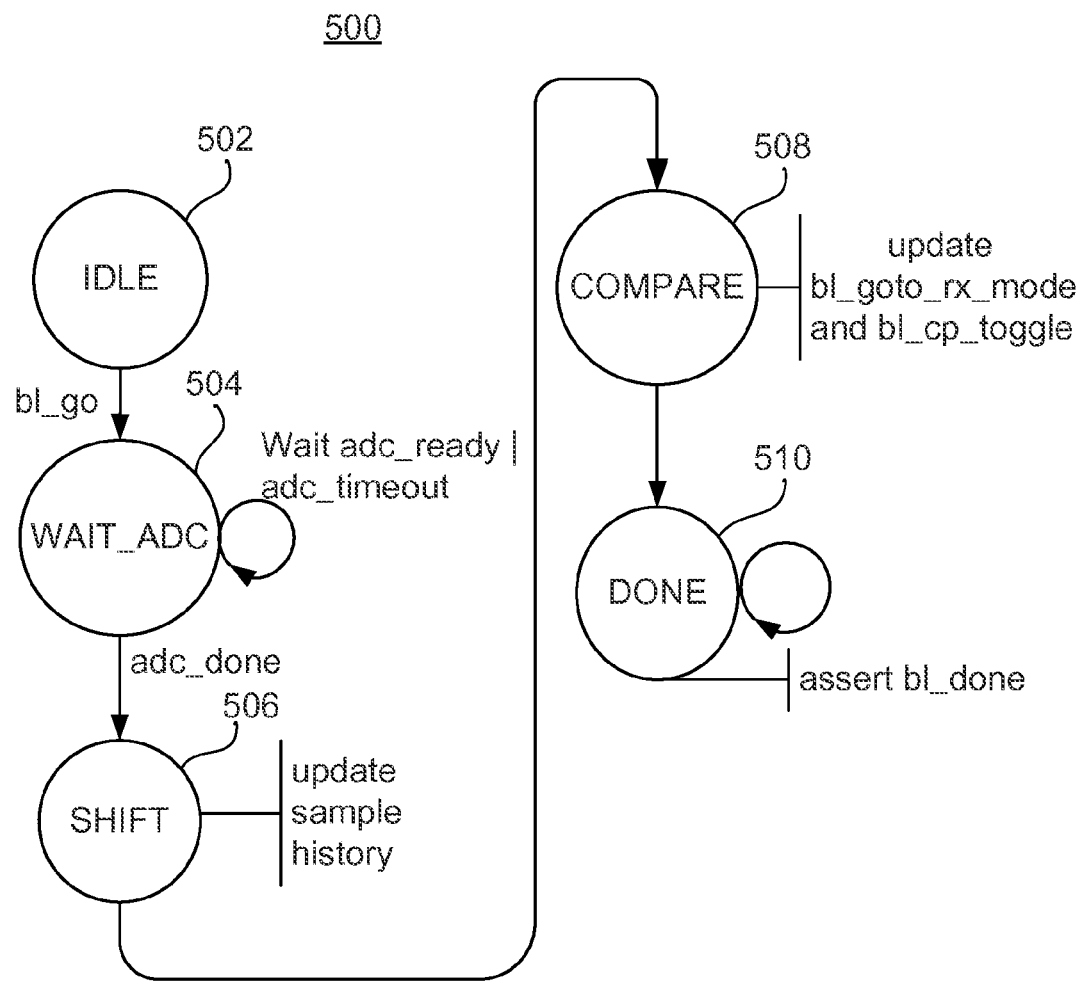
FIG. 5 is a state transition diagram of a blink detection system in accordance with at least one embodiment of the present invention.

FIG. 5 illustrates a state transition diagram 500 for a blink detection system in accordance with at least one embodiment. The system starts in an IDLE state 502 waiting for an enable signal bl_go to be asserted. When the enable bl_go signal is asserted, for example, by an oscillator and control circuit which pulses bl_go at a one hundred (100) ms rate commensurate with the blink sampling rate, the state machine then transitions to a WAIT_ADC state 504 in which an ADC is enabled to convert a received light level to a digital value. The ADC asserts an adc_done signal to indicate its operations are complete, and the system or state machine transitions to a SHIFT state 506. In the SHIFT state 506 the system pushes the most recently received ADC output value onto a shift register to hold the history of blink samples. In some embodiments, the ADC output value is first compared to a threshold value to provide a single bit (1 or 0) for the sample value, in order to minimize storage requirements. The system or state machine then transitions to a COMPARE state 508 in which the values in the sample history shift register are compared to one or more blink sequence templates and masks as described above. If a match is detected, one or more output signals may be asserted, such as one to switch the state of the lens to an asleep operation state or an awake operation state or to signal onset of sleep by the wearer. The system or state machine then transitions to the DONE state 510 and asserts a bl_done signal to indicate its operations are complete.

Figure 6:
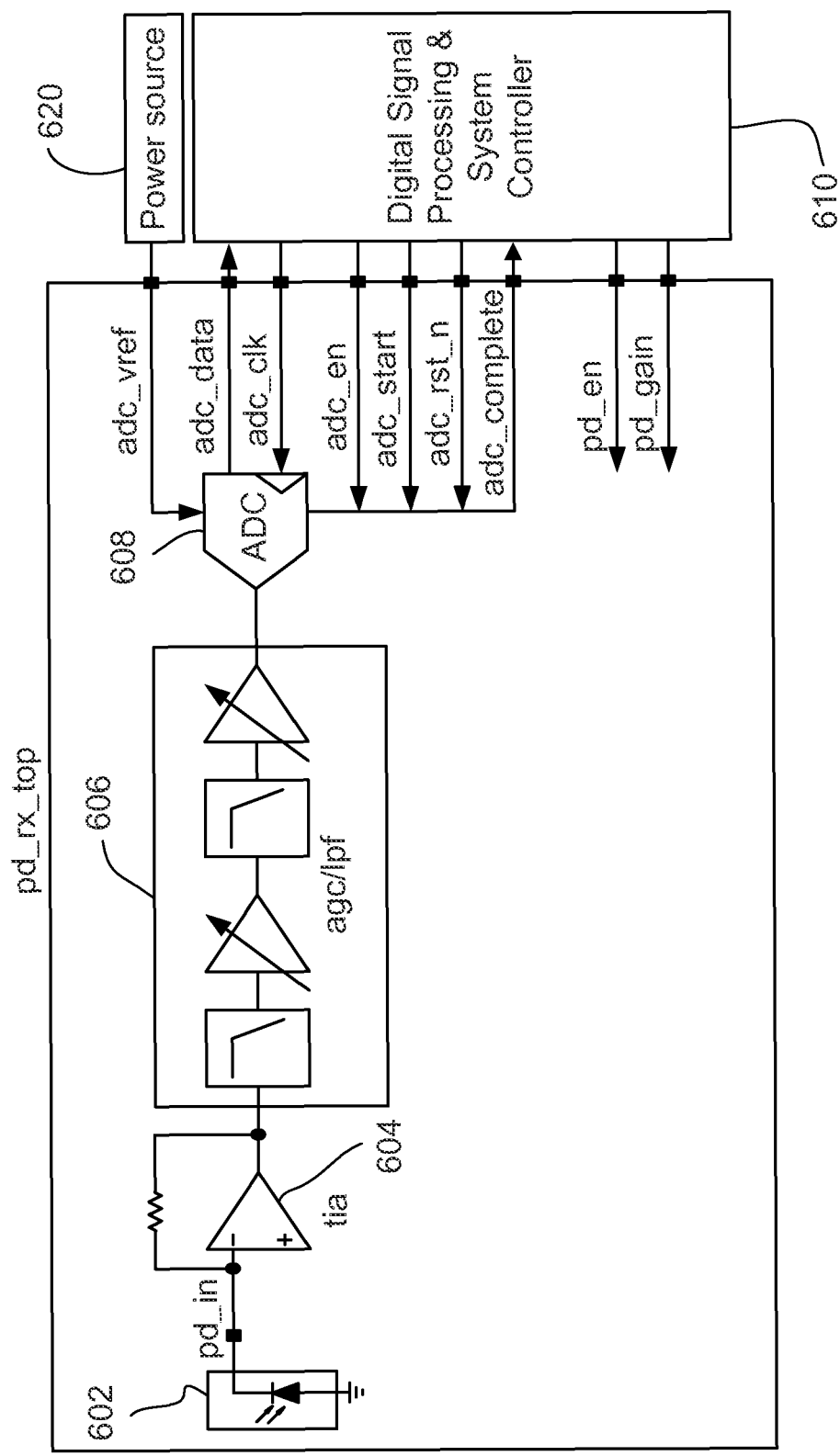
FIG. 6 illustrates a diagrammatic representation of a photodetection path utilized to detect and sample received light signals in accordance with at least one embodiment of the present invention.

FIG. 6 illustrates a photosensor or photodetector signal path pd_rx_top that may be used to detect and sample received light levels. The signal path pd_rx_top may include a photodiode 602, a transimpedance amplifier 604, an automatic gain and low pass filtering stage 606 (AGC/LPF), and an ADC 608. The adc_vref signal is input to the ADC 608 from the power source 620 (see power source 110 in FIG. 1A or 1B) or alternately it may be provided from a dedicated circuit inside the analog-to-digital converter 608. The output from the ADC 608, adc_data, is transmitted to the digital signal processing and system controller block 338/310 (see FIG. 3). Although illustrated in FIG. 3 as individual blocks 338 and 310, for ease of explanation, the digital signal processor 338 and system controller 310 are preferably implemented on a single block 610. The enable signal, adc_en, the start signal, adc_start, and the reset signal, adc_rst_n are received from the digital signal processing and system controller 610 while the complete signal, adc_complete, is transmitted thereto. The clock signal, adc_clk, may be received from a clock source external to the signal path, pd_rx_top, or from the digital signal processing and system controller 610. It is important to note that the adc_clk signal and the system clock may be running at different frequencies. It is also important to note that any number of different ADCs may be utilized in accordance with the present invention which may have different interface and control signals but which perform a similar function of providing a sampled, digital representation of the output of the analog portion of the photosensor signal path. The photodetect enable, pd_en, and the photodetect gain, pd_gain, are received from the digital signal processing and system controller 610.

Figure 7:
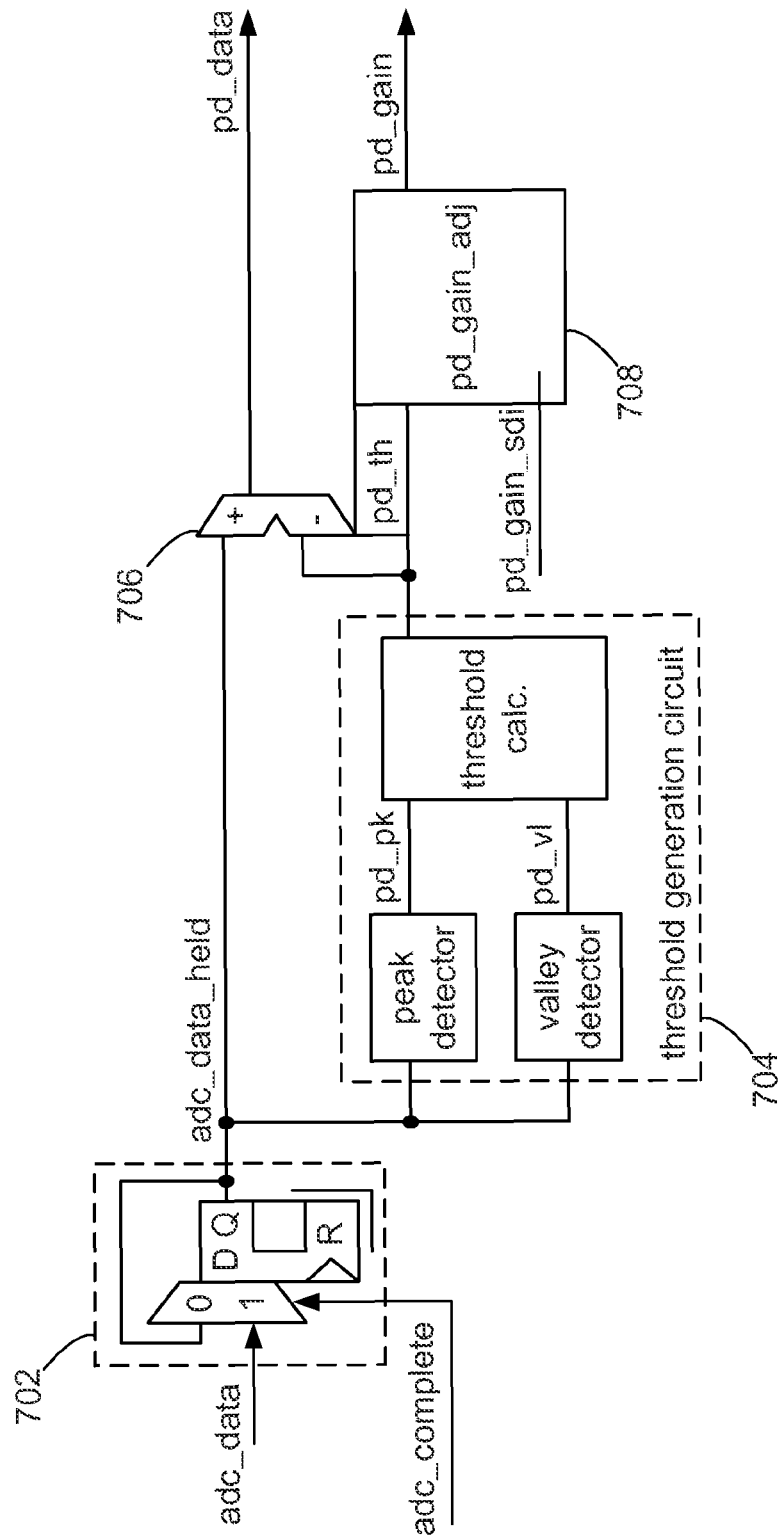
FIG. 7 illustrates a block diagram of digital conditioning logic in accordance with at least one embodiment of the present invention.

FIG. 7 illustrates a block diagram of digital conditioning logic 700 that may be used to reduce the received ADC signal value, adc_data, to a single bit value pd_data. The digital conditioning logic 700 may include a digital register 702 to receive the data, adc_data, from the photodetection signal path pd_rx_top to provide a held value on the signal adc_data_held. The digital register 702 is configured to accept a new value on the adc_data signal when the adc_complete signal is asserted and to otherwise hold the last accepted value when the adc_complete signal is received. In this manner the system may disable the photodetection signal path once the data is latched to reduce system current consumption. The held data value may then be averaged, for example, by an integrate-and-dump average or other averaging methods implemented in digital logic, in the threshold generation circuit 704 to produce one or more thresholds on the signal pd_th. The held data value may then be compared, via comparator 706, to the one or more thresholds to produce a one-bit data value on the signal pd_data. It will be appreciated that the comparison operation may employ hysteresis or comparison to one or more thresholds to minimize noise on the output signal pd_data. The digital conditioning logic may further include a gain adjustment block pd_gain_adj 708 to set the gain of the automatic gain and low-pass filtering stage 606 in the photodetection signal path via the signal pd_gain, illustrated in FIG. 6, according to the calculated threshold values and/or according to the held data value. It is important to note that in this embodiment six bit words provide sufficient resolution over the dynamic range for blink detection while minimizing complexity. FIG. 7 illustrates an alternative embodiment that includes providing a pd_gain_sdi control signal from, for example, the serial data interface that allows one to override the automatic gain control determined by gain adjustment block pd_gain_adj 708.

In one embodiment, the threshold generation circuit 704 includes a peak detector, a valley detector and a threshold calculation circuit. In this embodiment, the threshold and gain control values may be generated as follows. The peak detector and the valley detector are configured to receive the held value on signal adc_data_held. The peak detector is further configured to provide an output value, pd_pk, which quickly tracks increases in the adc_data_held value and slowly decays if the adc_data_held value decreases. The operation is analogous to that of a classic diode envelope detector, as is well-known in the electrical arts. The valley detector is further configured to provide an output value pd_vl which quickly tracks decreases in the adc_data_held value and slowly decays to a higher value if the adc_data_held value increases. The operation of the valley detector is also analogous to a diode envelope detector, with the discharge resistor tied to a positive power supply voltage. The threshold calculation circuit is configured to receive the pd_pl and pd_vl values and is further configured to calculate a mid-point threshold value pd_th_mid based on an average of the pd_pk and pd_vl values. The threshold generation circuit 704 provides the threshold value pd_th based on the mid-point threshold value pd_th_mid.

The threshold generation circuit 704 may be further adapted to update the values of the pd_pk and pd_vl levels in response to changes in the pd_gain value. If the pd_gain value increases by one step, then the pd_pk and pd_vl values are increased by a factor equal to the expected gain increase in the photodetection signal path. If the pd_gain value decreases by one step, then the pd_pk and pd val values are decreased by a factor equal to the expected gain decrease in the photodetection signal path. In this manner the states of the peak detector and valley detectors, as held in the pd_pk and pd_vl values, respectively, and the threshold value pd_th as calculated from the pd_pk and pd_vl values are updated to match the changes in signal path gain, thereby avoiding discontinuities or other changes in state or value resulting only from the intentional change in the photodetection signal path gain.

In a further embodiment of the threshold generation circuit 704, the threshold calculation circuit may be further configured to calculate a threshold value pd_th_pk based on a proportion or percentage of the pd_pk value. In at least one embodiment the pd_th_pk may be advantageously configured to be seven eighths of the pd_pk value, a calculation which may be implemented with a simple right shift by three bits and a subtraction as is well-known in the relevant art. The threshold calculation circuit may select the threshold value pd_th to be the lesser of pd_th_mid and pd_th_pk. In this manner, the pd_th value will never be equal to the pd_pk value, even after long periods of constant light incident on the photodiode which may result in the pd_pk and pd_vl values being equal. It will be appreciated that the pd_th_pk value ensures detection of a blink after long intervals. The behavior of the threshold generation circuit is further illustrated in FIGS. 11A-11G, as discussed subsequently.

Figure 8:
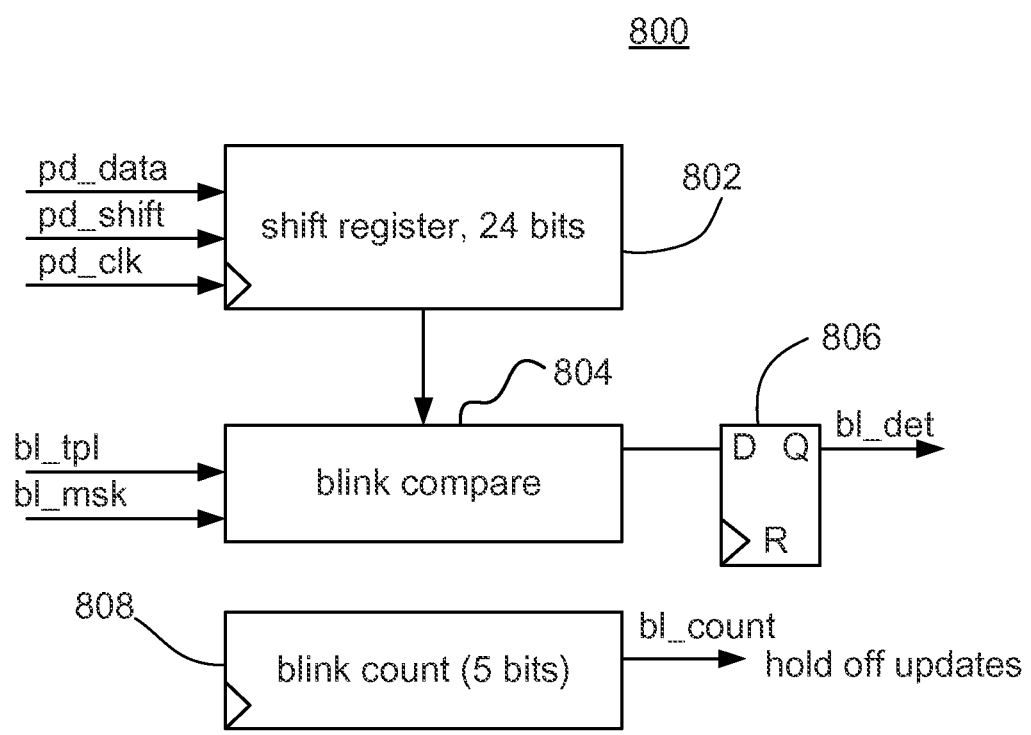
FIG. 8 illustrates a block diagram of digital detection logic in accordance with at least one embodiment of the present invention.

FIG. 8 illustrates a block diagram of digital detection logic 800 that may be used to implement a digital blink detection algorithm in accordance with at least one embodiment. The digital detection logic 800 may include a shift register 802 adapted to receive the data from the photodetection signal path pd_rx_top, FIG. 6, or from the digital conditioning logic, FIG. 7, as illustrated here on the signal pd_data, which has a one bit value. The shift register 802 holds a history of the received sample values, here in a 24-bit register. The digital detection logic 800 further includes a comparison block 804, adapted to receive the sample history and one or more templates bl_tpl and masks bl_mask based on operation state (if necessary), and is configured to indicate a match to the one or more templates and masks on one or more output signals that may be held for later use. In at least one embodiment, the operation state determines the set of templates bl_tpl and masks bl_mask to be used by the comparison block 804. In at least one set of the templates bl_tpl, there is at least one sleep template representative of the wearer falling asleep. In an alternative embodiment, the digital detection logic 800 includes a comparison block, adapted to contain one or more sleep templates, and is configured to indicate a match to the one or more templates and masks on one or more output signals that may be held for later use. In such an alternative embodiment, the lens does not have asleep and awake operation states.

The output of the comparison block 804 is latched via a D flip-flop 806. The digital detection logic 800 may further include a counter 808 or other logic to suppress successive comparisons that may be on the same sample history set at small shifts due to the masking operations. In a preferred embodiment the sample history is cleared or reset after a positive match is found, thus requiring a full, new matching sequence to be sampled before being able to identify a subsequent match. The digital detection logic 800 may still further include a state machine or similar control circuitry to provide the control signals to the photodetection signal path and the ADC. In some embodiments the control signals may be generated by a control state machine that is separate from the digital detection logic 800. This control state machine may be part of the digital signal processing and system controller 410 (see FIG. 4).

Figure 9:
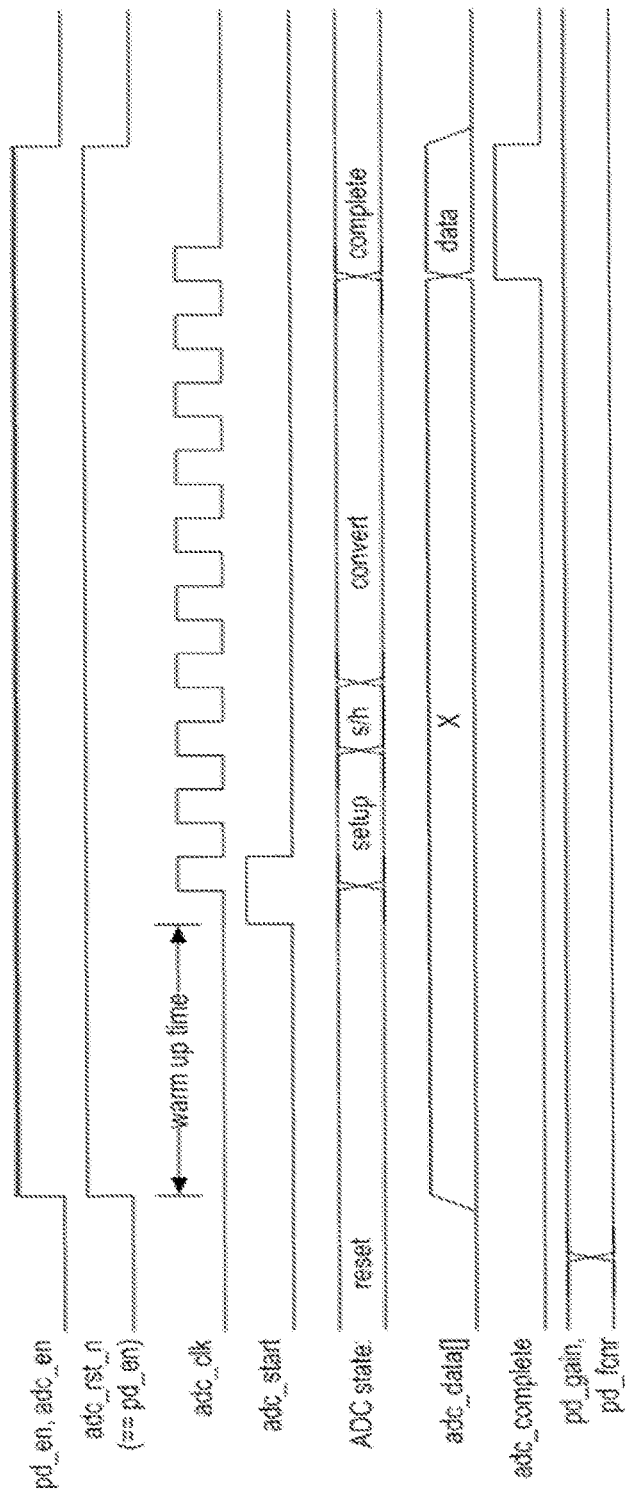
FIG. 9 illustrates a timing diagram in accordance with at least one embodiment of the present invention.

FIG. 9 illustrates a timing diagram of the control signals provided from a detection subsystem to an ADC 608 (FIG. 6) used in a photodetection signal path. The enable and clock signals adc_en, adc_rst_n and adc_clk are activated at the start of a sample sequence and continue until the analog-to-digital conversion process is complete. In one embodiment the ADC conversion process is started when a pulse is provided on the adc_start signal. The ADC output value is held in an adc_data signal and completion of the process is indicated by the analog-to-digital converter logic on an adc_complete signal. Also illustrated in FIG. 9 is the pd_gain signal which is utilized to set the gain of the amplifiers before the ADC. This signal is shown as being set before the warm-up time to allow the analog circuit bias and signal levels to stabilize prior to conversion.

Figure 10:
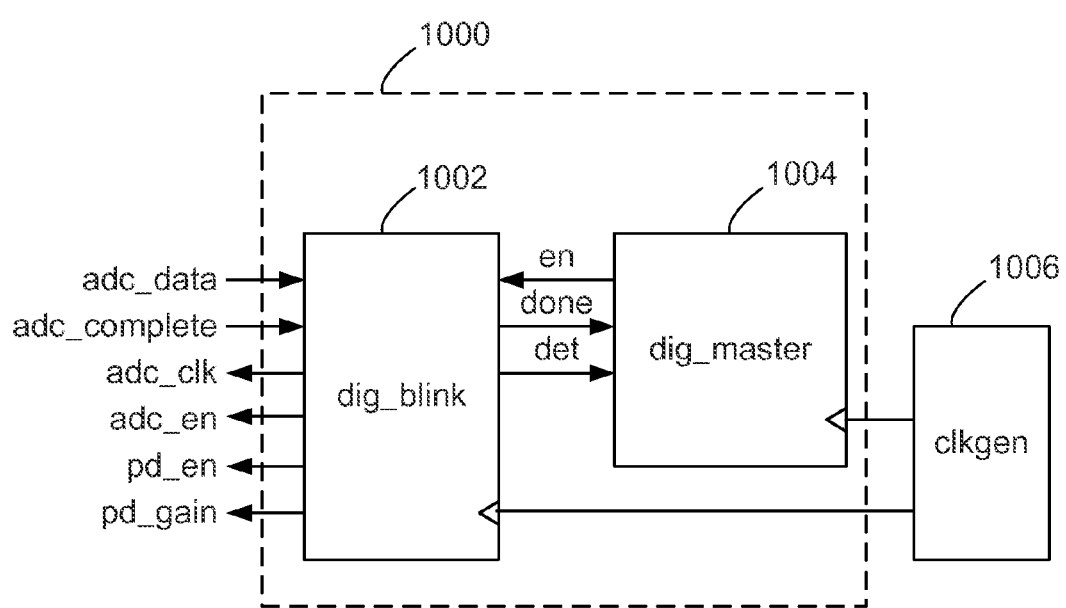
FIG. 10 illustrates a diagrammatic representation of a digital system controller in accordance with at least one embodiment of the present invention.

FIG. 10 illustrates a digital system controller 1000 having a digital blink detection subsystem dig_blink 1002. The digital blink detection subsystem dig_blink 1002 may be controlled by a master state machine dig_master 1004 and may be adapted to receive clock signals from a clock generator clkgen 1006 external to the digital system controller 1000. The digital blink detection subsystem dig_blink 1002 may be adapted to provide control signals to and receive signals from a photodetection subsystem as described above. The digital blink detection subsystem dig_blink 1002 may include digital conditioning logic and digital detection logic as described above, in addition to a state machine to control the sequence of operations in a blink detection algorithm. The digital blink detection subsystem dig_blink 1002 may be adapted to receive an enable signal from the master state machine 1004 and to provide a completion or done indication and a blink detection indication back to the master state machine 1004.

In an alternative embodiment to the embodiment illustrated in FIG. 10, a time clock is connected to the clock generator 1006 (in FIG. 10) to track time since the lens began operation and provide a time stamp signal to the data manager in an embodiment where the data manager records data regarding the initiation and termination of sleep by the wearer such that when data is transmitted (or sent) from the lens to an external device using, for example, at least one electronic communication component, the external device is able to determine what time periods the wearer was asleep while wearing the lens by reverse calculating the time of day based on the time stamp from the lens and the current time on the external device when the data is transmitted as compared to the logged time stamps.

Figure 11A:
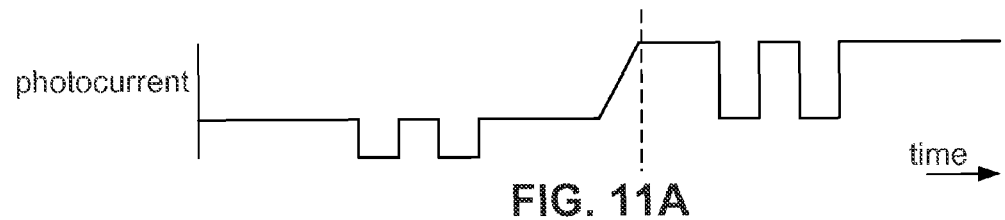
FIGS. 11A through 11G illustrate timing diagrams for automatic gain control in accordance with at least one embodiment of the present invention.
Figure 11B:
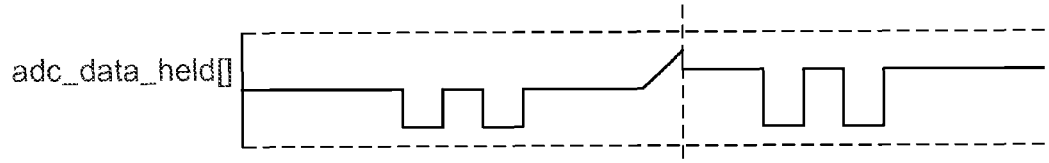
Figure 11C:
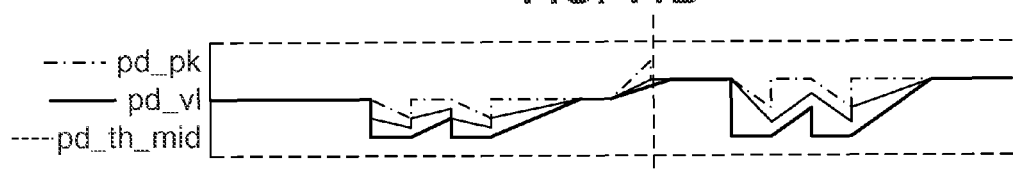
Figure 11D:
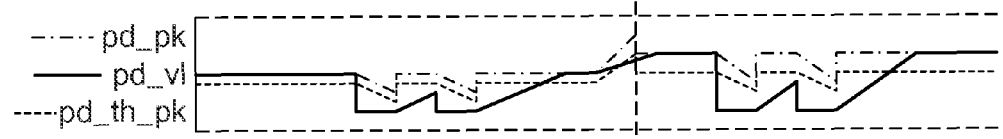
Figure 11E:
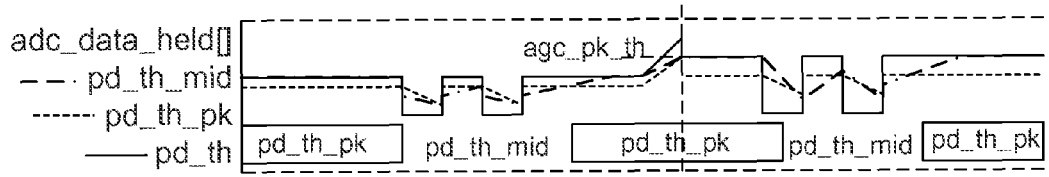
Figure 11F:
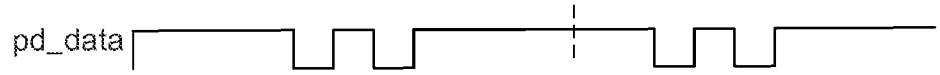
Figure 11G:
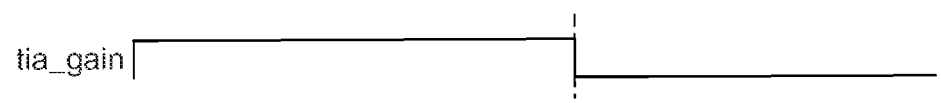

FIGS. 11A-11G depict waveforms to illustrate the operation of the threshold generation circuit and automatic gain control (FIG. 7). FIG. 11A illustrates an example of photocurrent versus time as might be provided by a photodiode in response to varying light levels. In the first portion of the plot, the light level and resulting photocurrent are relatively low compared to in the second portion of the plot. In both the first and second portions of the plot a double blink is seen to reduce the light and photocurrent. Note that the attenuation of light by the eyelid may not be one hundred (100) percent, but a lower value depending on the transmission properties of the eyelid for the wavelengths of light incident on the eye. FIG. 11B illustrates the adc_data_held value that is captured in response to the photocurrent waveform of FIG. 11A. For simplicity, the adc_data_held value is illustrated as a continuous analog signal rather than a series of discrete digital samples. It will be appreciated that the digital sample values will correspond to the level illustrated in FIG. 11B at the corresponding sample times. The dashed lines at the top and bottom of the plot indicate the maximum and minimum values of the adc_data and adc_data_held signals. The range of values between the minimum and maximum is also known as the dynamic range of the adc_data signal. As discussed below, the photodection signal path gain is different (lower) in the second portion of the plot. In general the adc_data_held value is directly proportional to the photocurrent, and the gain changes only affect the ration or the constant of proportionality. FIG. 11C illustrates the pd_pk, pd_vl and pd_th_mid values calculated in response to the adc_data_held value by the threshold generation circuit. FIG. 11D illustrates the pd_pk, pd_vl and pd_th_pk values calculated in response to the adc_data_held value in some embodiments of the threshold generation circuit. Note that the pd_th_pk value is always some proportion of the pd_pk value. FIG. 11E illustrates the adc_data_held value with the pd_th_mid and pd_th_pk values. Note that during long periods of time where the adc_data_held value is relatively constant the pd_th_mid value becomes equal to the adc_data_held value as the pd_vl value decays to the same level. The pd_th_pk value always remains some amount below the adc_data_held value. Also illustrated in FIG. 11E is the selection of pd_th where the pd_th value is selected to be the lower of pd_th_pk and pd_th_mid. In this way the threshold is always set some distance away from the pd_pk value, avoiding false transitions on pd_data due to noise on the photocurrent and adc_data_held signals. FIG. 11F illustrates the pd_data value generated by comparison of the adc_data_held value to the pd_th value. Note that the pd_data signal is a two-valued signal which is low when a blink is occurring. FIG. 11G illustrates a value of tia_gain versus time for these example waveforms. The value of tia_gain is set lower when the pd_th starts to exceed a high threshold shown as agc_pk th in FIG. 11E. It will be appreciated that similar behavior occurs for raising tia_gain when pd_th starts to fall below a low threshold. Looking again at the second portion of each of the FIGS. 11A through 11E the effect of the lower tia_gain is clear. In particular note that the adc_data_held value is maintained near the middle of the dynamic range of the adc_data and adc_data_held signals. Further, it is important to note that the pd_pk and pd_vl values are updated in accordance with the gain change as described above such that discontinuities are avoided in the peak and valley detector states and values due solely to changes in the photodetection signal path gain.

Figure 12:
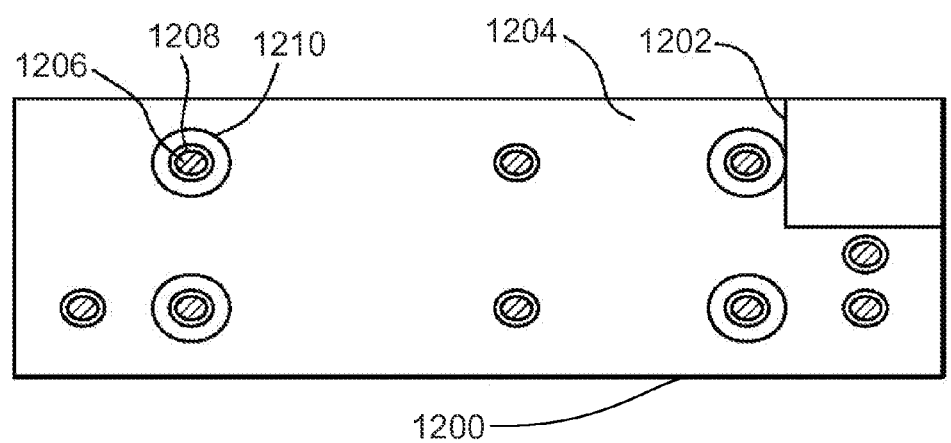
FIG. 12 illustrates a diagrammatic representation of light-blocking and light-passing regions on an integrated circuit die in accordance with at least one embodiment of the present invention.

FIG. 12 illustrates light-blocking and light-passing features on an integrated circuit die 1200. The integrated circuit die 1200 includes a light passing region 1202, a light blocking region 1204, bond pads 1206, passivation openings 1208, and light blocking layer openings 1210. The light-passing region 1202 is located above the photosensors (not illustrated), for example an array of photodiodes implemented in the semiconductor process. In at least one embodiment, the light-passing region 1202 permits as much light as possible to reach the photosensors thereby maximizing sensitivity. This may be done through removing polysilicon, metal, oxide, nitride, polyimide, and other layers above the photoreceptors, as permitted in the semiconductor process utilized for fabrication or in post-processing. The light-passing area 1202 may also receive other special processing to optimize light detection, for example, an anti-reflective coating, filter, and/or diffuser. The light-blocking region 1204 may cover other circuitry on the die which does not require light exposure. The performance of the other circuitry may be degraded by photocurrents, for example, shifting bias voltages and oscillator frequencies in the ultra-low current circuits required for incorporation into contact lenses, as mentioned previously. The light-blocking region 1204 is formed with a thin, opaque, reflective material, for example, aluminum or copper already used in semiconductor wafer processing and post-processing. If implemented with metal, the material forming the light-blocking region 1204 must be insulated from the circuits underneath and the bond pads 1206 to prevent short-circuit conditions. Such insulation may be provided by the passivation already present on the die as part of normal wafer passivation, e.g. oxide, nitride, and/or polyimide, or with other dielectric added during post-processing. Masking permits light blocking layer openings 1210 so that conductive light-blocking metal does not overlap bond pads on the die. The light-blocking region 1204 is covered with additional dielectric or passivation to protect the die and avoid short-circuits during die attachment. This final passivation has passivation openings 1208 to permit connection to the bond pads 1206.

In an alternative embodiment where the contact lens includes tinting capabilities, the light-passing region 1202 is at least partially overlapping with the region of the contact lens capable of being tinted. Where the photosensors are present in both the tinting region and non-tinting regions of the contact lens, it allows for a determination of the amount of light being blocked by the tinting. In a further embodiment, the entire light-passing region 1202 is present in the tinting region.

Figure 13:
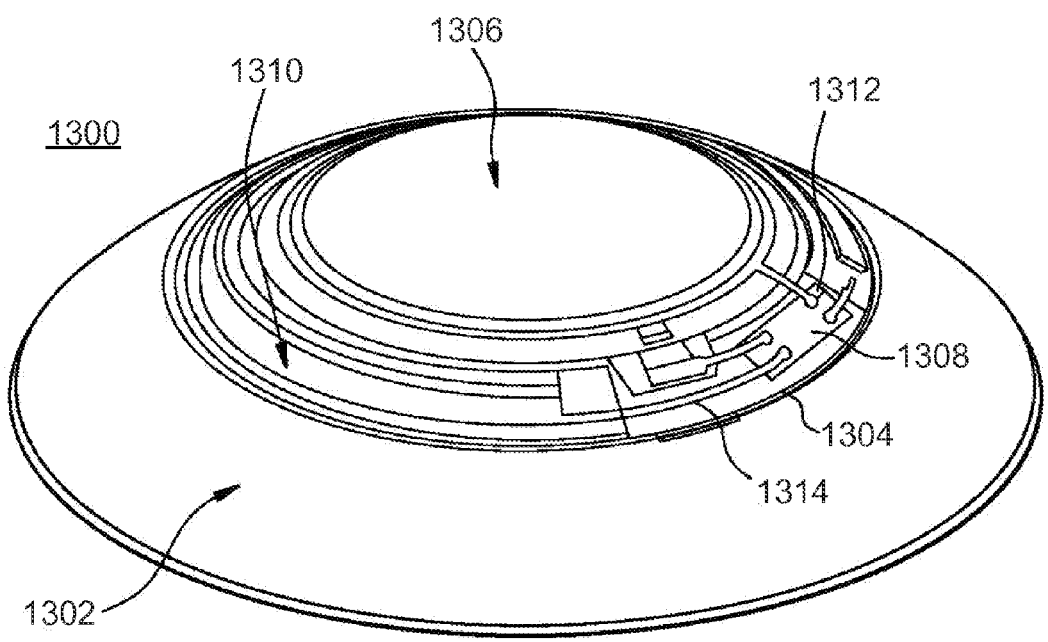
FIG. 13 illustrates a diagrammatic representation of an electronic insert, including a blink detector, for a powered contact lens in accordance with at least one embodiment of the present invention.

FIG. 13 illustrates a contact lens with an electronic insert having a blink detection system. The contact lens 1300 includes a soft plastic portion 1302 which provides an electronic insert 1304. This insert 1304 includes a lens 1306 which is activated by the electronics, for example, focusing near or far depending on activation. Integrated circuit 1308 mounts onto the insert 1304 and connects to batteries 1310, lens 1306, and other components as necessary for the system. In at least one embodiment, the integrated circuit 1308 includes a photosensor 1312 and associated photodetector signal path circuits. The photosensor 1312 faces outward through the lens insert 1304 and away from the eye, and is thus able to receive ambient light. The photosensor 1312 may be implemented on the integrated circuit 1308 (as shown), for example, as a single photodiode or array of photodiodes. The photosensor 1312 may also be implemented as a separate device mounted on the insert 1304 and connected with wiring traces 1314. When the eyelid closes, the lens insert 1304 including photodetector 1312 is covered, thereby reducing the light level incident on the photodetector 1312. The photodetector 1312 is able to measure the ambient light to determine if the user is blinking or not. Based on this disclosure one of ordinary skill in the art should appreciate that photodetector 1312 may be replaced or augmented by the other sensors discussed in this disclosure.

Additional embodiments of blink detection may allow for more variation in the duration and spacing of the blink sequence, for example, by timing the start of a second blink based on the measured ending time of a first blink rather than by using a fixed template or by widening the mask "don't care" intervals (0 values).

It will be appreciated that blink detection and/or sleep detection may be implemented in digital logic or in software running on a microcontroller. The algorithm logic or microcontroller may be implemented in a single application-specific integrated circuit (ASIC) with photodetection signal path circuitry and a system controller, or it may be partitioned across more than one integrated circuit.

In accordance with another embodiment, a powered or electronic ophthalmic lens may incorporate an eyelid or lid position sensor. It is known that the eyelids protect the globe in a number of ways, including the blink reflex and the tear spreading action. The blink reflex of the eyelids prevents trauma to the globe by rapidly closing upon a perceived threat to the eye. Blinking also spreads tears over the globe's surface to keep it moist and rinse away bacteria and other foreign matter. But the movement of the eyelids may also indicate other actions or functions at play beyond being used to alert an individual (or wearer) wearing an electronic ophthalmic lens that an alarm has been activated.

Figure 14A:
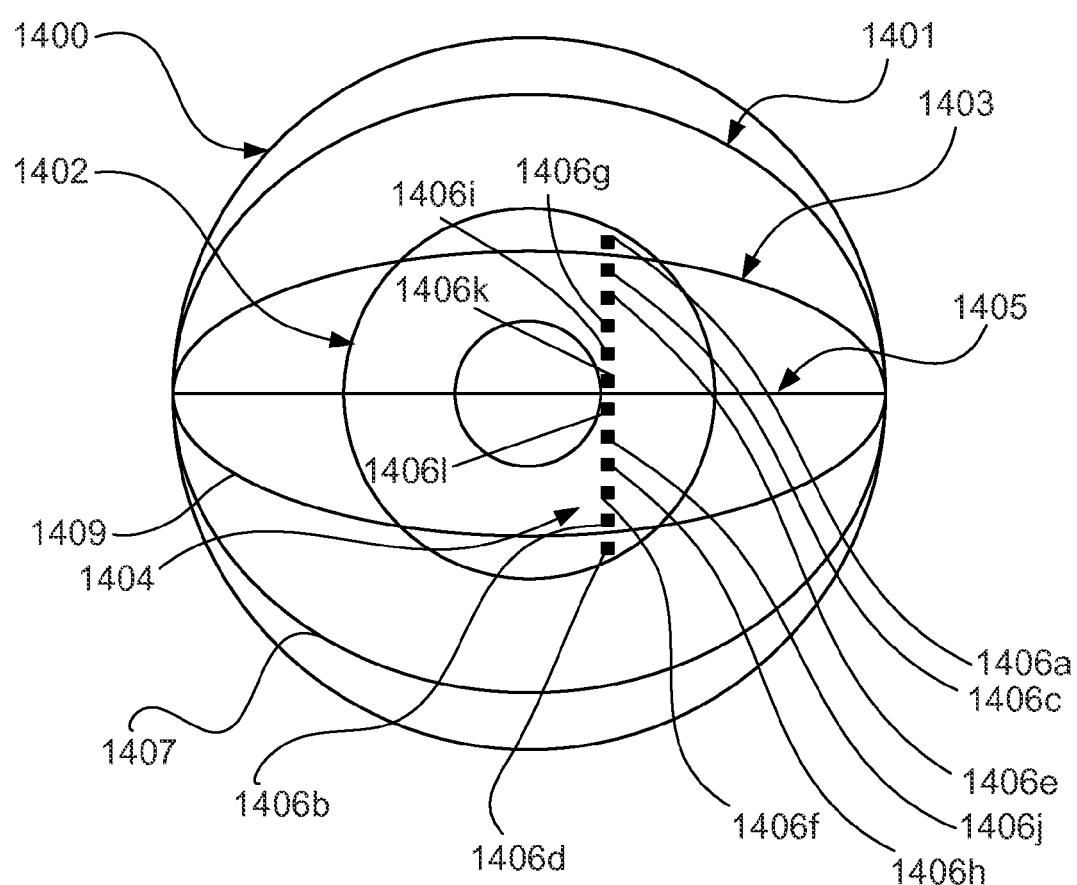
FIGS. 14A and 14B illustrate diagrammatic representations of eyelid position sensors in accordance with at least one embodiment of the present invention.
Figure 14B:
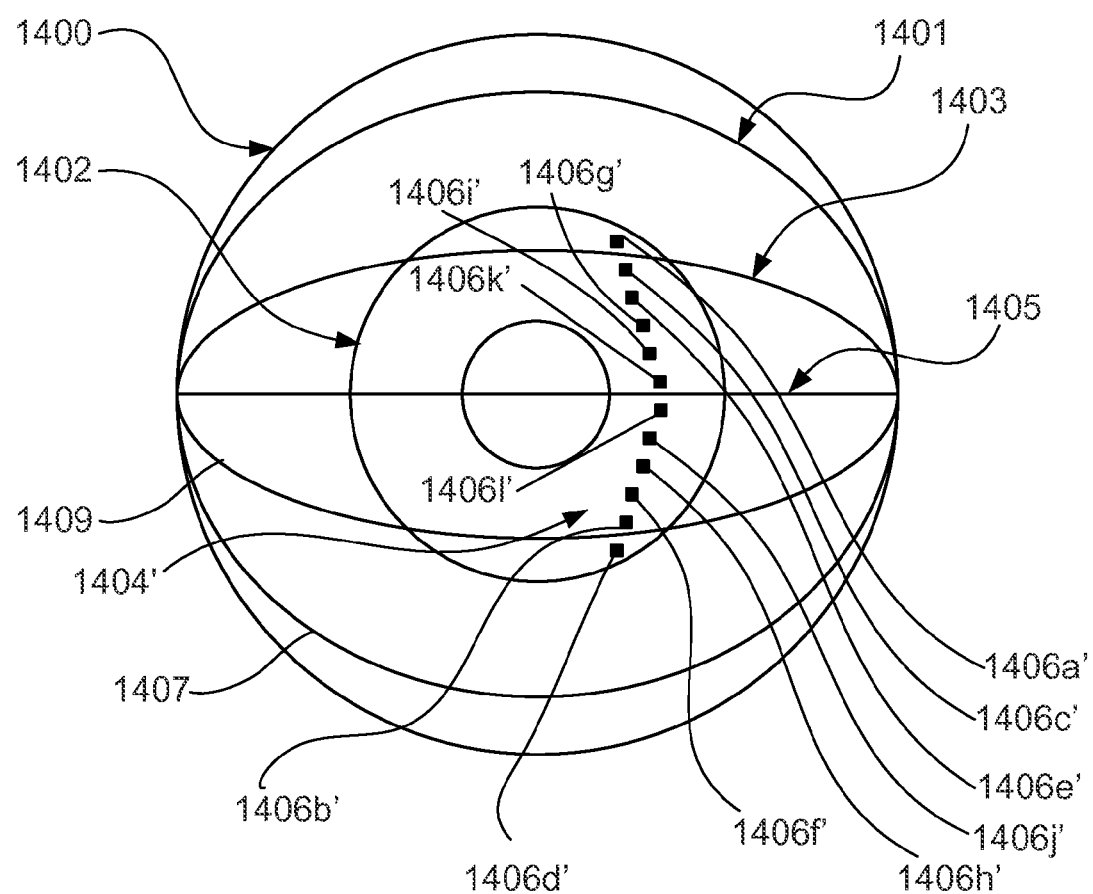

Referring now to FIG. 14A, there is illustrated an eyelid position sensor system on an eye 1400. The system is incorporated into a contact lens 1402. The top and bottom eyelids are shown, with the top lid having possible locations 1401, 1403, and 1405 in order of increasing closure. The bottom eyelid is also illustrated with levels of closure corresponding to the top lid; namely, locations 1407, 1409 and 1405. When the eyelids are closed, they occupy the same position; namely, 1405. The contact lens 1402 in accordance with the embodiment includes a sensor array 1404. This sensor array 1404 includes one or more photosensors. In this embodiment, the sensor array 1404 includes twelve (12) photosensors 1406a-1406l. With the top lid at position 1401 and the bottom lid at position 1407, all photosensors 1406a-1406l are exposed and receive ambient light, thereby creating a photocurrent which may be detected by an electronic circuit described herein. With the lids partially closed at positions 1403 and 1409, the top and bottom photosensors 1406a and 1406b are covered, receive less light than the other photosensors 1406c-1406l, and output a correspondingly lower current which may be detected by the electronic circuit. With the lids totally closed in position 1405, all sensors 1406a-1406l are covered with a corresponding reduction in current. This system may be used to detect lid position by sampling each photosensor in the sensor array and using the photocurrent output versus sensor position to determine lid position, for example, if the upper and lower eyelids do not fully open after blinks indicating potential onset of sleep or fatigue. It will be appreciated that the photosensors should be placed in suitable locations on the contact lens, for example providing enough sample locations to reliably determine lid position while not obstructing the clear optic zone (roughly the area occupied by a dilated pupil.) This system may also be used to detect blinks by routinely sampling the sensors and comparing measurements over time. In an alternative embodiment, photosensors 1406a'-1406l' of a sensor array 1404' form an arcuate pattern around the pupil while being vertically spaced from each other as illustrated, for example, in FIG. 14B. Under either of the illustrated embodiment, one of ordinary skill in the art should appreciate that a number other than 12 may be used in the sensor array. Further examples include a number in a range of 3 through 15 (including the end points in at least one embodiment), and more particularly a number in a range of 4 through 8 (including the end points in at least one embodiment).

Figure 15A:
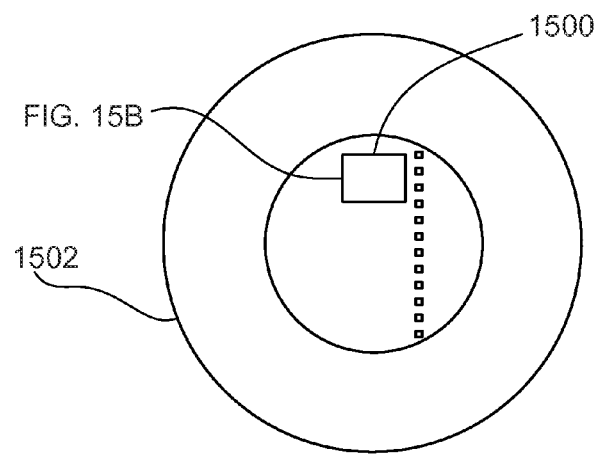
FIG. 15A illustrates a diagrammatic representation of an electronic system incorporated into a contact lens for detecting eyelid position in accordance with at least one embodiment of the present invention.
Figure 15B:
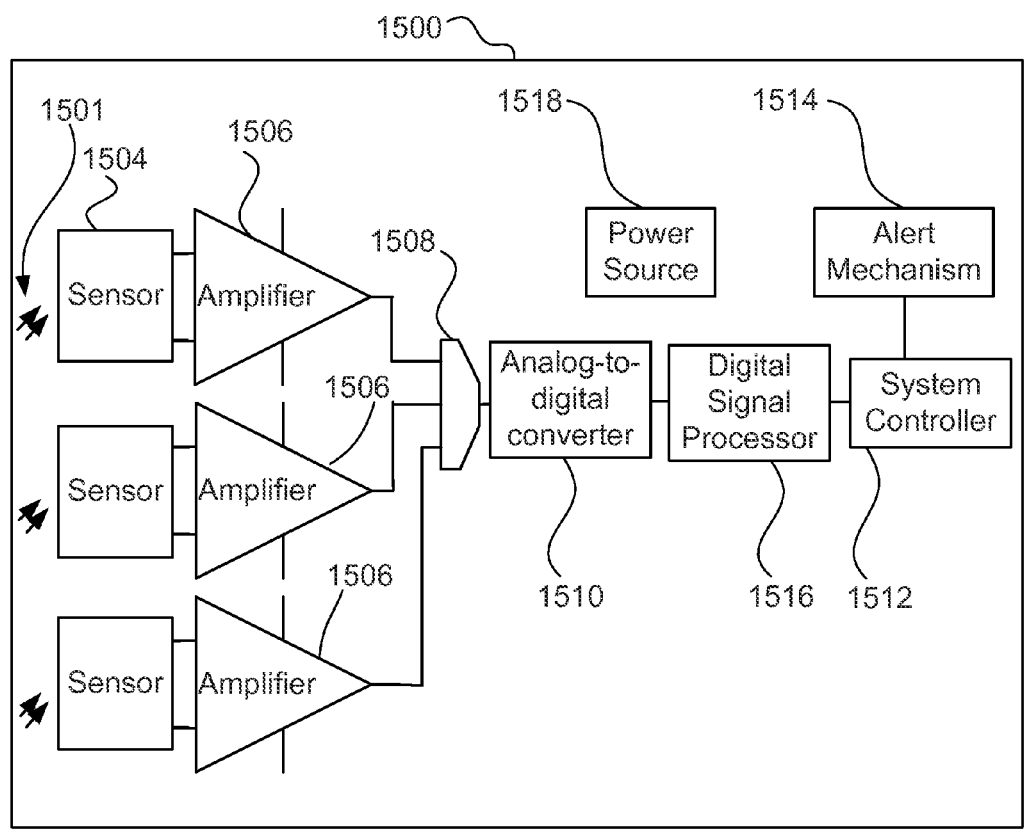
FIG. 15B illustrates an enlarged view of the electronic system of FIG. 15A.

FIGS. 15A and 15B illustrate an electronic system 1500 in which lid position photosensors, as set forth above, are used to trigger activity in a contact lens 1502 or more specifically, a powered or electronic ophthalmic lens. FIG. 15A shows the electronic system 1500 on the lens 1502, and FIG. 15B is an exploded view of the system 1500. Light 1501 is incident onto one or more photosensors 1504 as previously described with respect to FIGS. 14A and 14B. These photosensors 1504 may be implemented with photodiodes, cadmium sulfide (CdS) sensors, or other technologies suitable for converting ambient light into current. Depending on the choice of photosensors 1504, amplifiers 1506 or other suitable circuitry may be required to condition the input signals for use by subsequent or downstream circuits. A multiplexer 1508 permits a single analog-to-digital converter (or ADC) 1510 to accept inputs from multiple photosensors 1504. The multiplexer 1508 may be placed immediately after the photosensors 1504, before the amplifiers 1506, or may not be used depending on considerations for current consumption, die size, and design complexity. Since multiple photosensors 1504 are needed at various positions on the eye to detect lid position, sharing downstream processing components (for example amplifiers, an analog-to-digital converter, and digital signed system controllers) may significantly reduce the size needed for the electronic circuitry. The amplifiers 1506 create an output proportional to the input, with gain, and may function as transimpedance amplifiers which convert input current into output voltage. The amplifiers 1506 may amplify a signal to a usable level for the remainder of the system, such as giving the signal enough voltage and power to be acquired by the ADC 1510. For example, the amplifiers 1506 may be necessary to drive subsequent blocks since the output of the photosensors 1504 may be quite small and may be used in low-light environments. Amplifiers 1506 may also be implemented as variable-gain amplifiers, the gain of which may be adjusted by a system controller 1512 to maximize the dynamic range of the system 1500. In addition to providing gain, the amplifiers 1506 may include other analog signal conditioning circuitry, such as filtering and other circuitry appropriate to the photosensor 1504 and amplifier 1506 output. The amplifiers 1506 may be any suitable device for amplifying and conditioning the signal output by the photosensor 1504. For example, the amplifiers 1504 may simply be a single operational amplifier or a more complicated circuit comprising one or more operational amplifiers.

As set forth above, the photosensors 1504 and the amplifiers 1506 are configured to detect incident light 1501 at various positions on the eye and convert the input current into a digital signal usable ultimately by the system controller 1512. In at least one embodiment, the system controller 1512 is preprogrammed to sample each photosensor 1504 on the eye to detect lid position and provide an appropriate output signal to an alert mechanism 1514. The system controller 1512 also includes associated memory. The system controller 1512 may combine recent samples of the photosensors 1504 to preprogrammed patterns correlating to lid open and squinting positions. The system 1500 may need to differentiate between eyelid position changes, normal changes in ambient light, shadows, and other phenomena. This differentiation may be accomplished through proper selection of the sampling frequency, amplifier gain, and other system parameters, optimization of sensors placement in the contact lens, determination of lid position patterns, recording ambient light, comparing each photosensor to adjacent and all photosensors, and other techniques to discern lid position uniquely.

In at least one embodiment, the ADC 1510 may be used to convert a continuous, analog signal output from the amplifiers 1506 through the multiplexer into a sampled, digital signal appropriate for further signal processing. For example, the ADC 1510 may convert an analog signal output from the amplifiers 1506 into a digital signal that may be useable by subsequent or downstream circuits, such as a digital signal processing system or microprocessor 1516. A digital signal processing system or digital signal processor 1516 may be utilized for digital signal processing, including one or more of filtering, processing, detecting, and otherwise manipulating/processing sampled data to permit incident light detection for downstream use. The digital signal processor 1516 may be preprogrammed with various lid position and/or closure patterns. The digital signal processor 1516 also includes associated memory in at least one embodiment. The digital signal processor 1516 may be implemented utilizing analog circuitry, digital circuitry, software, and/or preferably a combination thereof. The ADC 1510 along with the associated amplifiers 1506 and digital signal processor 1516 are activated at a suitable rate in agreement with the sampling rate previously described, for example, every one hundred (100) ms.

A power source 1518 supplies power for numerous components including the eyelid position sensor system 1500. The power source 1518 may also be utilized to supply power to other components in the contact lens. The power may be supplied from a battery, energy harvester, or other suitable means as is known to one of ordinary skill in the art. Essentially, any type of power source 1518 may be utilized to provide reliable power for all other components of the system. A lid position sensor array pattern, processed from analog to digital, may enable activation of the system controller 1512 or a portion of the system controller 1512. Furthermore, the system controller 1512 may control other aspects of a powered contact lens depending on input from the digital signal system controller 1508, for example, activating the alert mechanism 1514.

Figure 16:
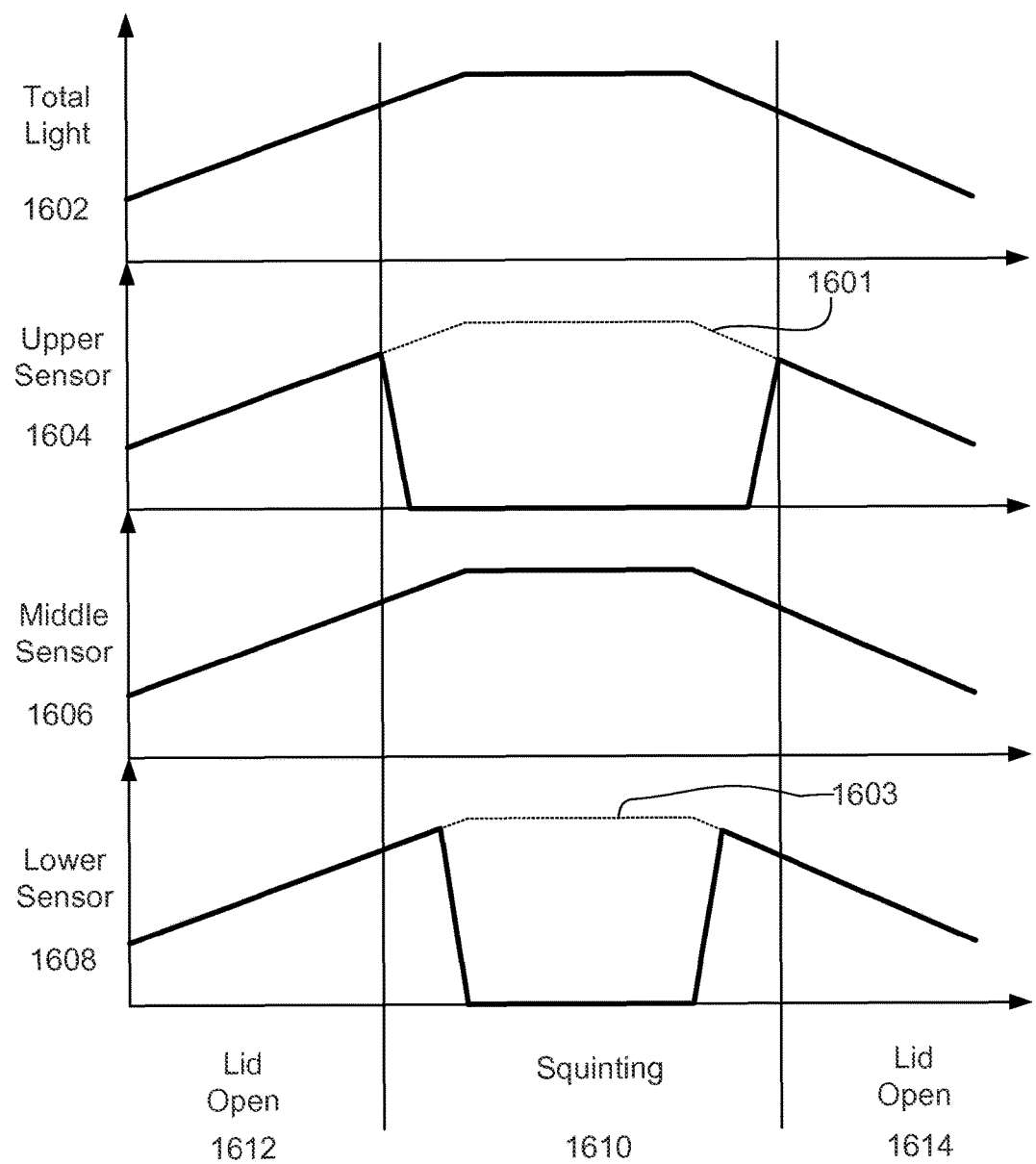
FIG. 16 illustrates a diagrammatic representation of outputs from eyelid position sensors in accordance with at least one embodiment of the present invention.

Referring now to FIG. 16, there is illustrated an output characteristic for three photosensors positioned at three different vertical positions on the contact lens. The output characteristics may represent the current proportional to incident light on each photosensor or may represent a downstream signal, for example, digital sampled data values versus time at the output of the ADC (element 1510 in FIG. 15B). Total incident light 1602 increases, holds steady, then decreases, for example, when walking from a dark room to a bright hallway then back to a dark room. All three photosensors 1604, 1606, and 1608 would output a signal similar to that of the ambient light if the eyelid remained open, illustrated by dotted lines 1601 and 1603 for photosensors 1604 and 1608. In addition to the ambient light level 1602 changing, partial closure of the eyelids is indicated by position 1610, different than that of the lid open positions 1612 and 1614. When the lid partially closes, upper photosensor 1604 becomes covered by the upper eyelid and outputs a correspondingly lower level due to obstruction of the photosensor by the eyelid. Despite ambient light 1602 increasing, photosensor 1604 receives less light and outputs a lower signal due to the partially closed eyelid. Similar response is observed with photosensor 1608 which becomes covered. Middle sensor 1606 is not covered during squinting and thus continues to see the light level increase, with a corresponding increase in output level. While this example illustrates one particular case, it should be apparent how various configurations of sensor position and eyelid movement could be detected.

Figure 17A:
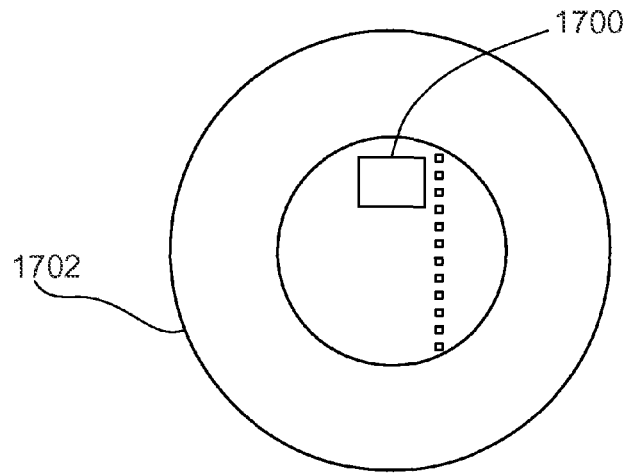
FIG. 17A illustrates a diagrammatic representation of another electronic system incorporated into a contact lens for detecting eyelid position in accordance with at least one embodiment of the present invention.
Figure 17B:
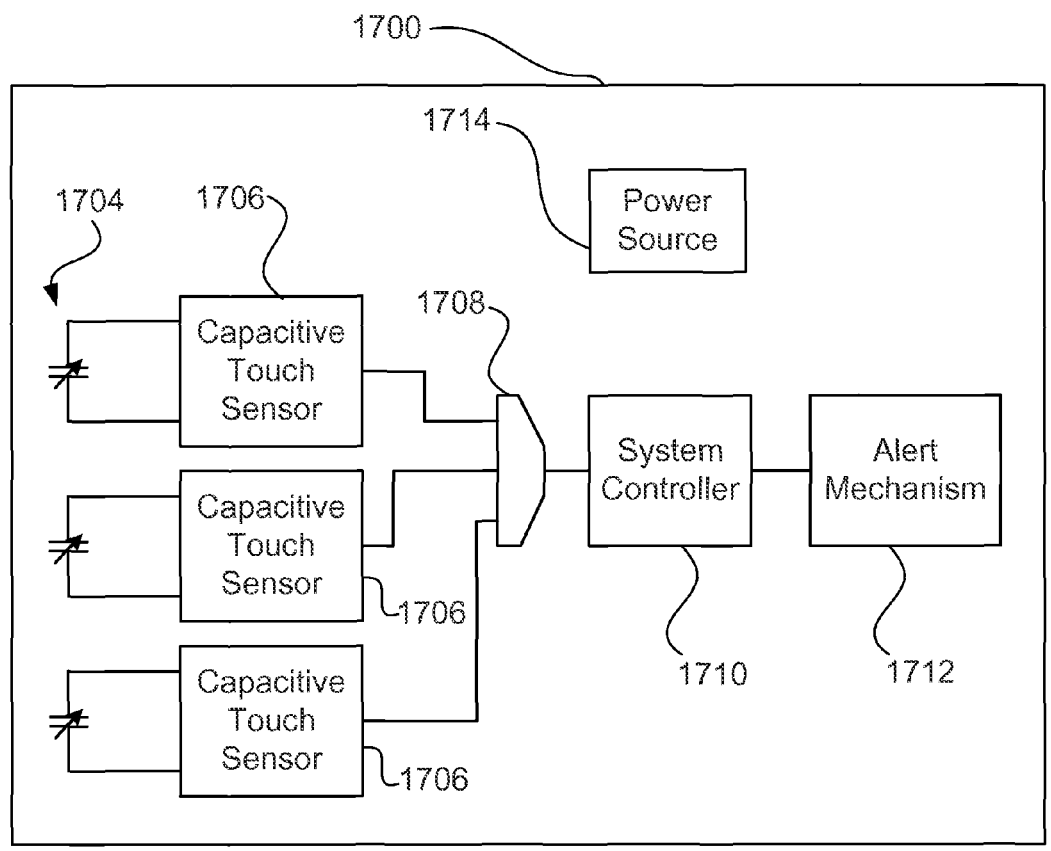
FIG. 17B illustrates an enlarged view of the electronic system of FIG. 17A.

FIGS. 17A and 17B illustrate an alternative detection system 1700 incorporated into a contact lens 1702. FIG. 17A illustrates the system 1700 on the lens 1702 and FIG. 17B illustrates an exploded view of the system 1700. In this embodiment, capacitive touch sensors 1704 are utilized instead of photosensors. Capacitive touch sensors are common in the electronics industry, for example, in touch-screen displays. The basic principle is that a capacitive touch sensor (or variable capacitor) 1704 is implemented in a physical manner such that the capacitance varies with proximity or touch, for example, by implementing a grid covered by a dielectric. Sensor conditioners 1706 create an output signal proportional to the capacitance, for example, by measuring the change in an oscillator having the variable capacitor or by sensing the ratio of the variable capacitor to a fixed capacitor with a fixed-frequency AC signal. The output of the sensor conditioners 1706 may be combined with a multiplexer 1708 to reduce downstream circuitry. In this embodiment, the necessary signal conditioning circuitry as described above with respect to FIG. 15 is omitted for simplicity. A system controller 1710 receives inputs from the capacitance sensor conditioner 1706 via the multiplexor 1708, for example, by activating each sensor in order and recording the values. It may then compare measured values to pre-programmed patterns and historical samples to determine lid position. It may then activate a function in an alert mechanism 1712, for example, causing a variable-focus lens to change to a closer focal distance. The capacitor touch sensors 1704 may be laid out in a physical pattern similar to that previously described for the photodetectors, but would be optimized for detecting changes in capacitance with lid position. The sensors, and for that matter the whole electronic system, would be encapsulated and insulated from the saline contact lens environment. As the eyelid covers a sensor 1704, the change in capacitance would be detected rather than the change in ambient light previously described. FIG. 17B also illustrates the inclusion of a power source 1714 in at least one embodiment.

It is important to note that ADC's and digital signal processing circuitry may be utilized in accordance with the capacitive touch sensors if needed as illustrated with respect to the photosensors of FIG. 15B. In an alternative embodiment, the capacitive touch sensors are any pressure sensor. In a further embodiment, there is a combination of photosensors and pressure sensors on the lens.

In one embodiment, the electronics and electronic interconnections are made in the peripheral zone of a contact lens rather than in the optic zone. In accordance with an alternate embodiment, it is important to note that the positioning of the electronics need not be limited to the peripheral zone of the contact lens. All of the electronic components described herein may be fabricated utilizing thin-film technology and/or transparent materials. If these technologies are utilized, the electronic components may be placed in any suitable location as long as they are compatible with the optics.

Figure 18A:
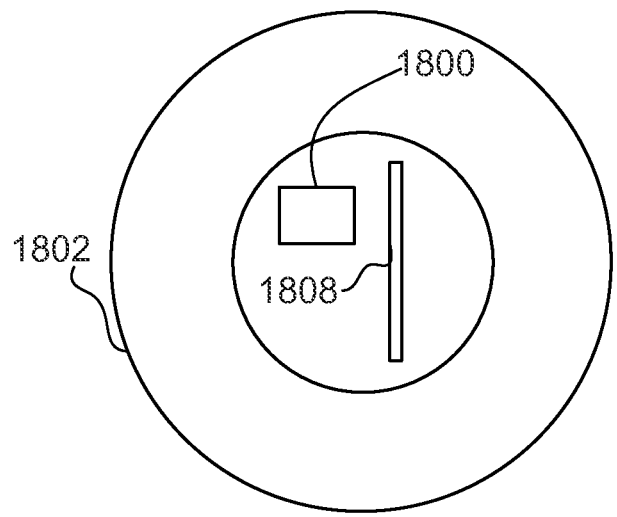
FIG. 18A-18C illustrate diagrammatic representations of an eyelid position detecting system in accordance with at least one embodiment of the present invention.
Figure 18B:
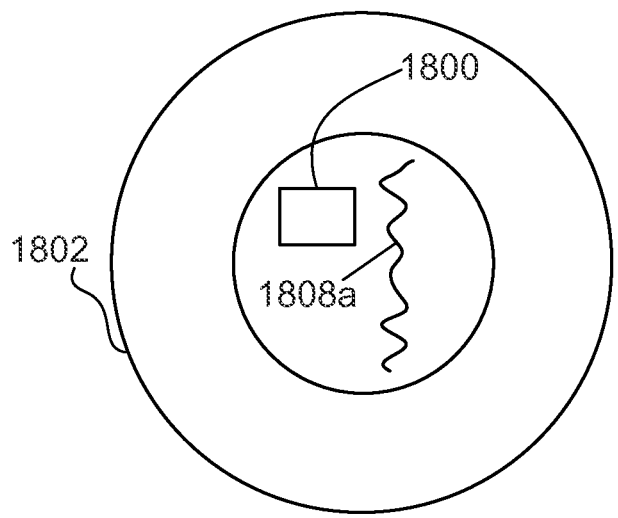
Figure 18C:
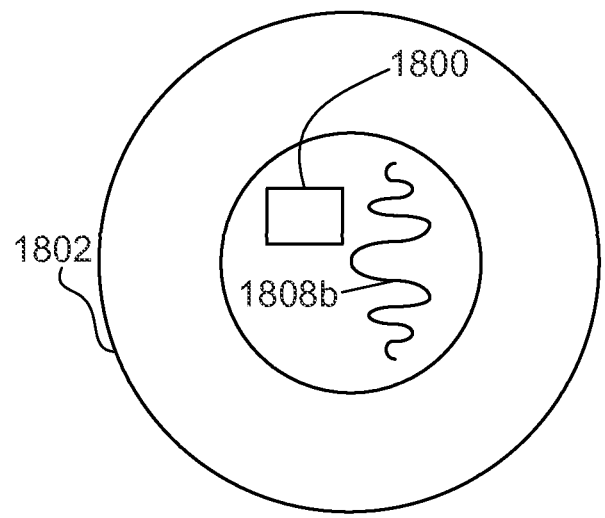
Figure 18D:
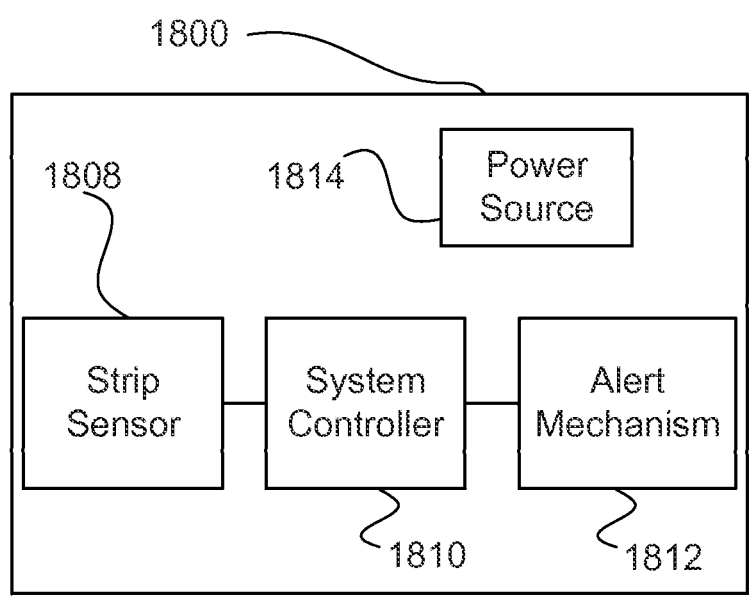
FIG. 18D illustrates an enlarged view of the electronic system of FIGS. 18A-18C.

FIGS. 18A-18D illustrate an alternative embodiment where the lid position sensor system is a sensor having a strip that covers a plurality of vertical points along the contact lens 1802 that works in conjunction with circuit 1800. One example of a sensor that may have a strip configuration is a capacitance sensor. FIG. 18A illustrates an example where the strip 1808 is substantially straight on the contact lens 1802. Although the strip 1808 is illustrated as being orientated parallel to a line bisecting the contact lens 1802, it may have an angled orientation relative to the bisecting line or have an arcuate shape. FIG. 18B illustrates an example where the strip 1808a takes a serpentine path along the contact lens 1802. In the embodiment illustrated in FIG. 18C, the serpentine configuration of strip 1808b will increase the change in capacitance detected by the circuit 1800 as the eyelids approach a closed state. The level of capacitance change will translate to the amount of eyelid closure. Another example of a sensor that may have a strip configuration is a piezoelectric pressure transducer with a diaphragm and a base having a strip configuration. As the eyelids close, additional pressure will be applied by the eyelids against the piezoelectric pressure transducer thus allowing for a determination of the level of eyelid closure. The continuous sensing along the vertical axis provides an improved granularity over a plurality of sensors thus providing improved measurement of the eyelid location. FIG. 18D illustrates an electrical circuit that can be used in conjunction with strip sensors 1808, 1808a, 1808b that includes a system controller 1810, an alert mechanism 1812 and a power source 1814. In a further alternative embodiment, there are multiple strips present. An advantage of an angled and/or serpentine strip configuration is that lid position may still be detected even if the contact lens is orientated incorrectly on the wearer's eye.

The activities of the digital signal processing block and system controller (1516 and 1512 in FIG. 15B, respectively, system controller 1710 in FIG. 17B, and system controller 1810 in FIG. 18D) depend on the available sensor inputs, the environment, and user reactions. The inputs, reactions, and decision thresholds may be determined from one or more of ophthalmic research, pre-programming, training, and adaptive/learning algorithms. For example, the general characteristics of eyelid movement may be well-documented in literature, applicable to a broad population of users, and pre-programmed into system controller. However, an individual's deviations from the generally expected response and/or changes in blink frequency may be recorded in a training session or part of an adaptive/learning algorithm which continues to refine the response in operation of the electronic ophthalmic device. In one embodiment, the user may train the device by activating a handheld fob, which communicates with the device, when the user desires near focus. A learning algorithm in the device may then reference sensor inputs in memory before and after the fob signal to refine internal decision algorithms. This training period could last for one day, after which the device would operate autonomously with only sensor inputs and not require the fob.

In an alternative embodiment, the system further includes an eye movement sensor system that can provide an indication of whether the wearer is in rapid eye movement (REM) sleep at the time that the alarm is to be triggered. In at least one embodiment, if the eyelid position system detects that the eyelids are closed at the time for the alarm trigger, then the eye movement sensor system is sampled by the system controller. If the system controller detects eye movement, then the type of alarm may be adjusted to reflect the wearer's REM sleep. In a further embodiment, if the system controller receives readings from the eye movement sensor system that the wearer is prone and from the eyelid position sensor system that the eyelids are closed, then the type of alarm may be adjusted to reflect the wearer is asleep. In a further embodiment, the alarm is started at a lower level of intensity that grows over a period of time to provide a gentler alert to the wearer. In an alternative embodiment, the alarm provided is an escalated alarm.

Figure 19A:
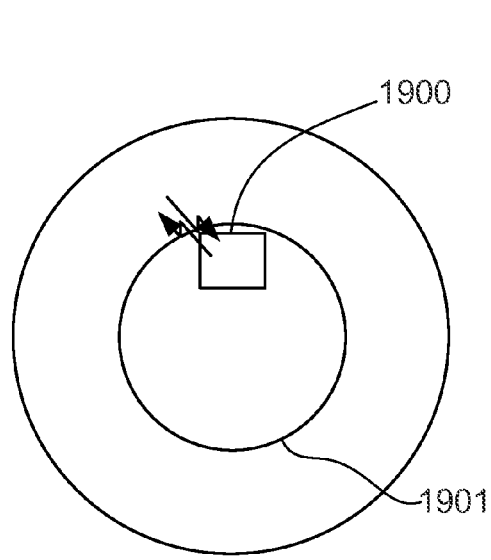
FIG. 19A illustrates a diagrammatic representation of a pupil position and convergence detection system incorporated into a contact lens in accordance with at least one embodiment of the present invention.
Figure 19C:
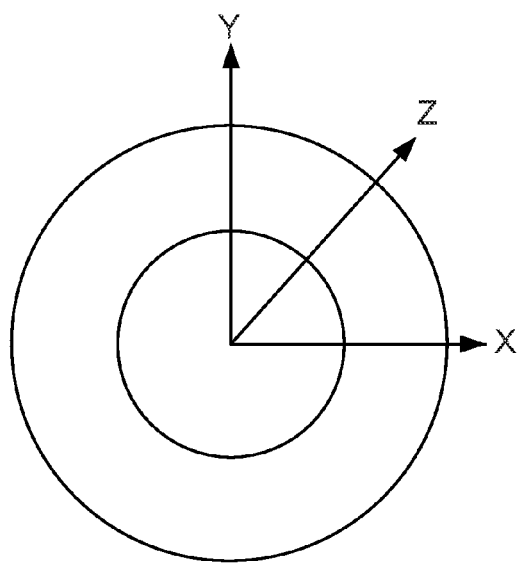
FIG. 19C illustrates an overlay of an X, Y, and Z axes on the eye.
Figure 19B:
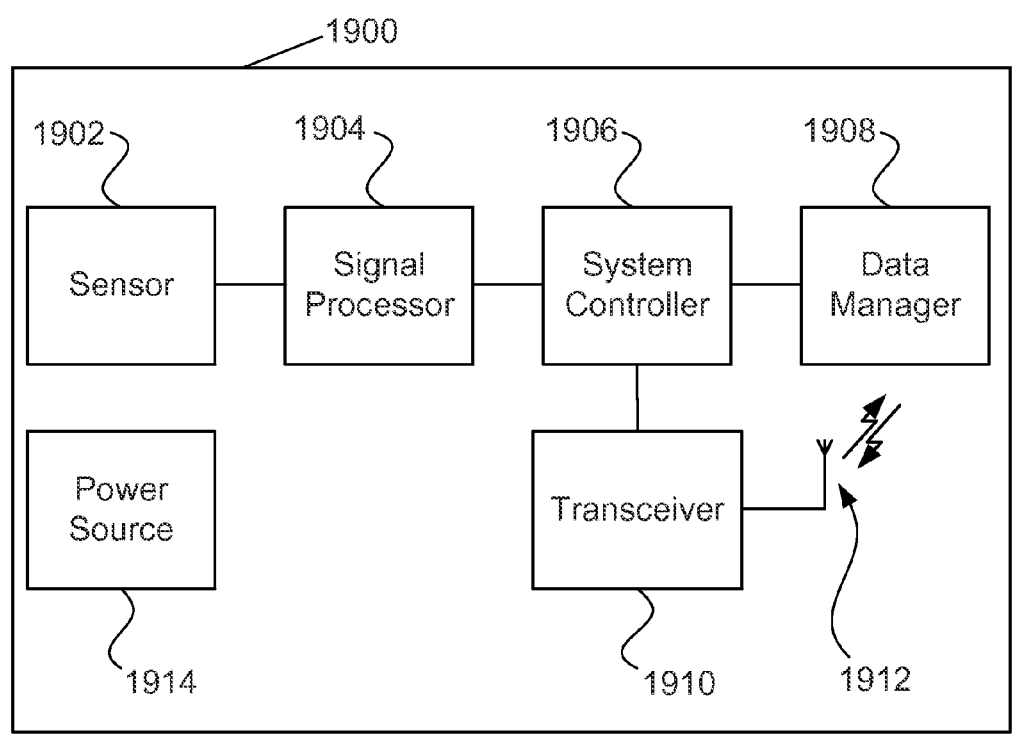
FIG. 19B is an enlarged view of the pupil position and convergence detection system of FIG. 19A.

FIGS. 19A and 19B illustrate an exemplary eye movement sensor system 1900 for detecting movement of the eye during, for example, sleep. Sensor 1902 detects the movement and/or position of the pupil or, more generally, the eye. The sensor 1902 may be implemented as a multi-axis accelerometer on a contact lens 1901. With the contact lens 1901 being affixed to the eye and generally moving with the eye, an accelerometer on the contact lens 1901 may track eye movement. It is important to note that any suitable device may be utilized as the sensor 1902, and more than a single sensor 1902 may be utilized. The output of the sensor 1902 is acquired, sampled, and conditioned by signal processor 1904. The signal processor 1904 may include any number of devices including an amplifier, a transimpedance amplifier, an analog-to-digital converter, a filter, a digital signal processor, and related circuitry to receive data from the sensor 1902 and generate output in a suitable format for the remainder of the components of the system 1900. The signal processor 1904 may be implemented utilizing analog circuitry, digital circuitry, software, and/or a combination thereof. In at least one embodiment, the signal processor 1904 and the sensor 1902 are fabricated on the same integrated circuit die. The sensor circuitry for acquisition and conditioning of an accelerometer is different than the circuitry for a muscle activity sensor or optical pupil tracker. The output of the signal processor 1904 in at least one embodiment is a sampled digital stream and may include absolute or relative position, movement, detected gaze in agreement with convergence, or other data. System controller 1906 receives input from the signal processor 1904 and uses this information, in conjunction with other inputs, to determine whether the wearer is asleep. System controller 1906 may both trigger the activity of sensor 1902 and the signal processor 1904 while receiving output from them. System controller 1906 uses input data from the signal processor 1904 and/or transceiver 1910 to decide if the wearer is lying down based on the orientation of the sensor 1902 based on orientation on an X, Y, and Z axes when no eye movement is detected. If the axes are as illustrated in FIG. 19C, then when the accelerometer detects stable acceleration in the X axis in either direction or in the Z axis in either direction, then the wearer's head has a horizontal orientation. When the accelerometer detects stable acceleration in the Y axis in the negative direction, then the wearer's head is vertical. When the accelerometer detects stable acceleration in the Y and Z axes with or without a stable acceleration in the X axis, then the wearer's head is tilted forward.

FIG. 19B illustrates an optional transceiver 1910 that receives and/or transmits communication through antenna 1912. This communication may come from an adjacent contact lens, spectacle lenses, or other devices. The transceiver 1910 may be configured for two-way communication with the system controller 1906. Transceiver 1910 may contain filtering, amplification, detection, and processing circuitry as is common in transceivers. The specific details of the transceiver 1910 are tailored for an electronic or powered contact lens, for example, the communication may be at the appropriate frequency, amplitude, and format for reliable communication between eyes, low power consumption, and to meet regulatory requirements. Transceiver 1910 and antenna 1912 may work in the radio frequency (RF) bands, for example 2.4 GHz, or may use light for communication. Information received from transceiver 1910 is input to the system controller 1906, for example, information from an adjacent lens which indicates orientation. The system controller 1906 may also transmit data from, for example the data manager 1908, to the transceiver 1910, which then transmits data over the communication link via antenna 1912.

The system controller 1906 may be implemented as a state machine, on a field-programmable gate array, in a microcontroller, or in any other suitable device. Power for the system 1900 and components described herein is supplied by a power source 1914, which may include a battery, energy harvester, or similar device as is known to one of ordinary skill in the art. The power source 1914 may also be utilized to supply power to other devices on the contact lens 1901.

The eye movement sensor system 1900 in at least one embodiment is incorporated and/or otherwise encapsulated and insulated from the saline contact lens 1901 environment.

In at least one embodiment, the electronics and electronic interconnections are made in the peripheral zone of a contact lens rather than in the optic zone. In accordance with an alternative embodiment, it is important to note that the positioning of the electronics need not be limited to the peripheral zone of the contact lens. All of the electronic components described herein may be fabricated utilizing thin-film technology and/or transparent materials. If these technologies are utilized, the electronic components may be placed in any suitable location as long as they are compatible with the optics.

In at least one embodiment, the system further includes a storage box. The storage box in at least one embodiment includes a housing with a base and a cover that are connected along one edge to facilitate opening the cover relative to the base to allow for deposit of the contact lens into a cavity in the housing. In alternative embodiments, the storage box may include disinfecting, monitoring, reordering and external connectivity functionality. The disinfecting functionality would allow for the lenses to be used over an extended period of time by the wearer.

Figure 20:
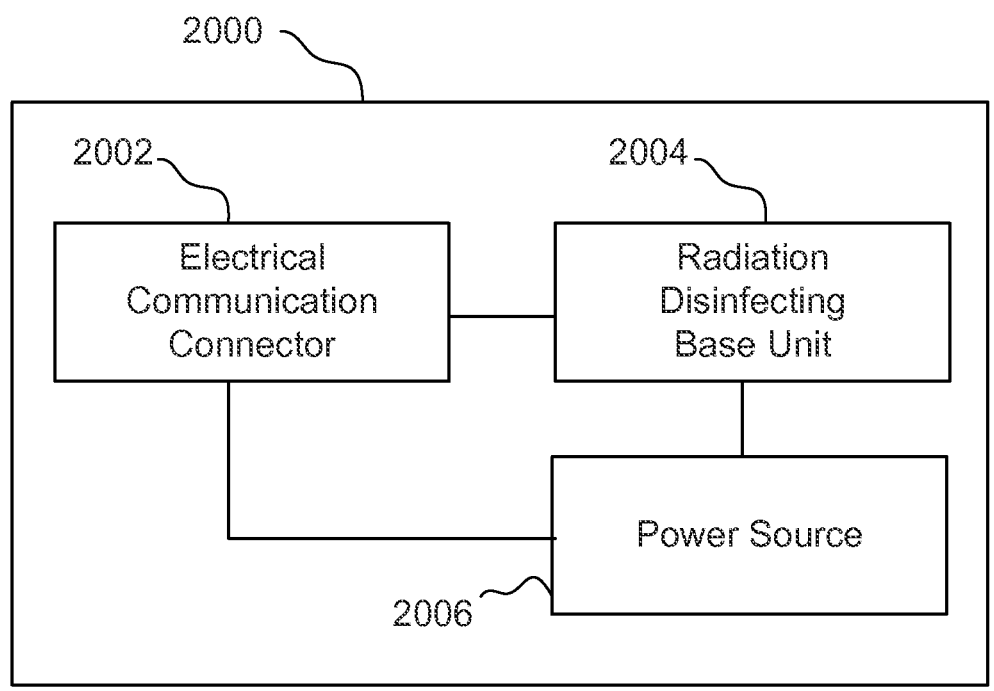
FIG. 20 illustrates a block diagram of a storage box in accordance with at least one embodiment of the present invention.

FIG. 20 illustrates an example storage box having a housing 2000, a communication system, a memory, a clock, an electrical communication connector 2002, and a power source 2006. In an alternative embodiment, the storage box includes a radiation disinfecting base unit 2004 contained within a housing such as the previously described housing and cover. The electrical communication connector 2002 may include a universal serial bus (USB) connector or other type of connector. The connector may include a terminal for transferring one or both of data and electrical power. In some embodiments, the electrical communication connector 2002 provides power to operate the radiation disinfecting base unit 2004. Some embodiments may also include one or more batteries 2006 or other power storage device. In some embodiments, the batteries 2006 include one or more lithium-ion batteries or other rechargeable device. The power storage devices may receive a charging electrical current via the electrical communication connector 2002. In at least one battery embodiment, the radiation disinfecting base unit 2004 is operational via stored power in the batteries 2006.

In at least one embodiment, the communication system includes an antenna such as a radio-frequency identification (RFID) antenna for interacting with inserted lenses and a controller electrically communicating with said antenna. In at least one embodiment, the controller is in electrical communication with at least one memory, which in at least one embodiment is flash memory like that used in a memory stick. Examples of the interaction include wireless recharging of the power source on one or both lenses, transferring of current time, transferring an alarm time, transferring data stored on the lens(es) to memory in (or in communication with) the storage box, and transferring templates and masks based on wearer-specific characteristics from the storage box to at least one lens. In an alternative embodiment, the antenna is used to communicate with an external device such as a computer or smart phone.

In at least one embodiment, the controller is configured to translate and/or format the data received from the at least one lens to change the time stamp information into actual times based on the current accumulator reading at the time of data transfer as correlated to the current time on the storage box. In an alternative embodiment, the storage box sends a signal to the lens to reset the accumulator to zero and the processor records in memory the time that the accumulator was reset to zero, or alternatively updates the accumulator to the correct time. After reinsertion of the lens into the storage box, the processor notes the current time and determines the number of sampling cycles. In the embodiments where the sampling cycles are of different lengths depending on what is being sampled and/or operational state of the lens(es) since removal of the lens(es), the storage box normalizes the sample periods over the time difference between removal of the lens(es) from the storage box and return of the lens(es) to the storage box as measured by the storage box. Alternatively when the sampling cycles are of different lengths, the storage box sends a signal to the contact lens to adjust its oscillator in an amount related to the time drift exhibited by the contact lens and in a further embodiment the storage box updates the time on the accumulator on the contact lens.

In some embodiments, the electrical communication connector 2002 may include a simple source of AC or DC current. In such embodiments, the power source 2006 may be omitted as power is provided through the electrical communication connector 2002.

An intraocular lens or IOL is a lens that is implanted in the eye and replaces the crystalline lens. It may be utilized for individuals with cataracts or simply to treat various refractive errors. An IOL typically includes a small plastic lens with plastic side struts called haptics to hold the lens in position within the capsular bag in the eye. Any of the electronics and/or components described herein may be incorporated into IOLs in a manner similar to that of contact lenses.

Although shown and described in what is believed to be the most practical embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A system for providing an alarm cue to a wearer of an ophthalmic lens on an eye, the system comprising:
   a timing circuit configured to track a passage of time;
   a communications system configured for facilitating at least one-way communication for receiving data;
   an alert mechanism configured to provide an alert, wherein the alert mechanism comprises at least one of the following:
   a light source positioned on the lens to provide a light onto at least one of a retina of a wearer of said lens and said lens itself as the alert,
   a transducer to vibrate the eye of the wearer of said lens as the alert,
   an electrical simulator configured to stimulate at least one of a corneal surface, a scleral surface, a sensory nerve of a cornea, and a sensory nerve of a sclera, and
   a transducer that provides optic zone modification of an optic zone of said lens;
   a system controller electrically connected to said timing circuit, said communication system, and said alert mechanism, said system controller configured for controlling said timing circuit, said communication system, and said alert mechanism; and
   an eyelid position sensor system incorporated into said lens, the eyelid position sensor system having a plurality of vertical points to detect eyelid position,
   wherein said system controller is in electrical communication with said eyelid position sensor system to receive a signal from said eyelid position sensor system representative of eyelid position, said system controller triggering an escalation of alerts from said alert mechanism when the eyelid remains closed and the accumulator value exceeds an alarm value,
   said ophthalmic lens capable of encapsulating at least a portion of said timing circuit, said communications system, said alert mechanism and said system controller.

2. The system according to claim 1, wherein said communications system includes a receiver configured for wirelessly receiving from an external device the received data and sending the received data to said system controller.

3. The system according to claim 2, wherein
   said timing circuit includes an accumulator for tracking time;
   said system controller further includes memory in which an alarm time is stored by said system controller, said system controller is configured to set a time on said accumulator in response to the received data and an alarm time in said memory in response to the received data.

4. The system according to claim 3, wherein
   said system controller is configured to send a signal to said alert mechanism when data in said accumulator matches data stored in said memory,
   said alarm mechanism is configured to provide an alert to a wearer of said ophthalmic lens in response to the signal received from said system controller.

5. The system according to claim 2, wherein
   said timing circuit includes an accumulator for tracking time;
   said system controller further includes memory in which an alarm time is stored by said system controller, said system controller is configured to reset said accumulator to zero in response to the received data and an alarm time in said memory in response to the received data.

6. The system according to claim 5, wherein
   said system controller is configured to send a signal to said alert mechanism when data in said accumulator matches data stored in said memory,
   said alarm mechanism is configured to provide an alert to a wearer of said ophthalmic lens in response to the signal received from said system controller.

7. The system according to claim 1, wherein
   said alert mechanism includes an electrical component, and
   said alert mechanism turns on said electrical component to alert the wearer in response to an alarm signal from said system controller.

8. The system according to claim 7, wherein said electrical component includes at least one of a LED and a transducer in vibrational contact with the wearer's eye.

9. The system according to claim 1, further comprising an external device configured to transmit to said communications system a time control signal as the received data; and
   wherein said communications system includes a receiver configured for wirelessly receiving the time control signal from the external device and sending the time control signal to said system controller;
   said timing circuit includes an accumulator for tracking time; and
   said system controller further includes memory in which an alarm time is stored by said system controller, said system controller configured to set a time on said timing circuit in response to the time control signal and an alarm time in said memory in response to the time control signal.

10. The system according to claim 9, wherein
    said system controller is configured to send a signal to said alert mechanism when data in said timing circuit matches data stored in said memory,
    said alarm mechanism is configured to provide an alert to a wearer of said contact lens in response to the signal received from said system controller.

11. A system for providing an alarm cue on two pupils, the system comprising:
    a first contact lens including
    a timing circuit configured to track a passage of time,
    a communications system configured for facilitating at least one-way communication with an external device,
    an alert mechanism configured to provide an alert,
    a system controller electrically connected to said timing circuit, said communication system, and said alert mechanism, said system controller configured for controlling said timing circuit, said communication system, and said alert mechanism, and
    an insert encapsulating at least a portion of said timing circuit, said communications system, said alert mechanism and said system controller of said contact lens;

a second contact lens including
a communications system configured for facilitating at least one-way communication with said communications system of said first contact lens including an alarm signal,
an alert mechanism configured to provide an alert in response to the alarm signal received from said communications system, and
an insert encapsulating at least a portion of said communications system and said alert mechanism, wherein each of said first contact lens and said second contact lens includes an eyelid position sensor system having a plurality of vertical points to detect eyelid position, and
wherein said system controller of said first contact lens is in electrical communication with said eyelid position sensor systems to receive a signal from each of said eyelid position sensor system representative of eyelid position,
said system controller triggers an alarm when a value as represented by a signal from said timing circuit matches an alarm value by sending a signal to said alert mechanism of said first contact lens and through said communications systems to said alert mechanism on said second contact lens where the signal causes activation of said alert mechanisms to provide an alarm, and
said system controller triggering an escalation of alerts from said alert mechanisms when the eyelids remain closed and the accumulator value exceeds an alarm escalation value that is greater than the alarm value.

12. The system according to claim 11, wherein said system controller is configured to sample at a predetermined rate, and at least temporarily saving collected samples, determining when the eyelids are open or closed in order to determine the number, time period and pulse width of the blinks from the collected samples, calculating a number of blinks and the duration of the blinks in a given time period, comparing the number of blinks, the durations of the blinks in the given time period, and the time between blinks in the given time period to a stored set of samples to determine patterns in blinking, and determining if the blinks correspond to one or more intentional blink sequences; and wherein said intentional blink sequences control operation of system controller triggering said alert mechanisms and include at least one of an alarm snooze, an alarm termination, and an alarm value setting.

13. The system according to claim 11, wherein
each alert mechanism includes an electrical component, and
each alert mechanism turns on said electrical component to alert the wearer in response to an alarm signal from said system controller.

14. The system according to claim 13, wherein said electrical component includes at least one of a LED and a transducer in vibrational contact with the wearer's eye.

15. The system according to claim 11, wherein at least one alert mechanism comprises at least one of the following:
a light source positioned in said lens to provide a light onto at least one of a retina of a wearer of said lens and said lens itself as the alert,
a transducer to vibrate an eye of a wearer of said lens as the alert,
an electrical simulator configured to stimulate at least one of a corneal surface, a scleral surface, a sensory nerve of a cornea, and a sensory nerve of a sclera, and
a transducer that provides optic zone modification of an optic zone of said lens.

16. The system according to claim 11, further comprising an external device configured to transmit to said communications system of said first contact lens a time control signal; and
wherein said communications system of said first contact lens includes a receiver configured for wirelessly receiving the time control signal from said external device and sending the time control signal to said system controller;
said timing circuit includes an accumulator for tracking time; and
said system controller further includes memory in which an alarm time is stored by said system controller, said system controller configured to set a time on said timing circuit in response to the time control signal and an alarm time in said memory in response to the time control signal.

* * * * *